(12) United States Patent
Williams et al.

(10) Patent No.: US 6,580,623 B1
(45) Date of Patent: Jun. 17, 2003

(54) FLEXIBLE CONVERTER ROUTING APPARATUS, SYSTEM AND METHOD

(75) Inventors: Timothy J. Williams, Bellevue, WA (US); Steven P. Larky, Del Mar, CA (US); David G. Wright, Woodinville, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/967,260

(22) Filed: Sep. 28, 2001

Related U.S. Application Data

(60) Provisional application No. 60/294,529, filed on May 30, 2001.

(51) Int. Cl.[7] .............................................. H02M 11/00
(52) U.S. Cl. ....................................................... 363/78
(58) Field of Search ............................... 363/78, 79, 80, 363/81, 84, 95; 307/66, 82

(56) References Cited

U.S. PATENT DOCUMENTS

| | | | | |
|---|---|---|---|---|
| 4,860,185 A | * | 8/1989 | Brewer et al. | 363/41 |
| 5,477,132 A | * | 12/1995 | Canter et al. | 323/282 |
| 5,982,645 A | * | 11/1999 | Levran et al. | 363/37 |
| 6,281,606 B1 | * | 8/2001 | Westlake | 307/125 |

* cited by examiner

*Primary Examiner*—Adolf Deneke Berhane
(74) *Attorney, Agent, or Firm*—Suiter West PC LLO

(57) ABSTRACT

The present invention is directed to a flexible converter suitable for providing a routing function. A flexible converter of the present invention may provide a desired output utilizing a variety of methods, systems and apparatus without departing from the spirit and scope of the present invention. A routing apparatus may include a converter, at least one comparator and a controller. The converter is capable of providing an output supply from an input supply coupled to the converter, the output supply capable of routing between a first output and a second output. At least one comparator is coupled to the output supply of the converter, the comparator capable of measuring at least one power characteristic of the first output and the second output to a first electrical device and to a second electrical device. The controller is coupled to the comparator; the controller being capable of implementing a process within the converter such that the first output is routed to the first electrical device and the second output is routed to the second electrical device. The first output and the second output are monitored with the at least one comparator and the first output to the first electrical device and the second output to the second electrical device are re-routed based upon the monitoring by the comparator.

20 Claims, 21 Drawing Sheets

FLEXIBLE CONVERTER ROUTING APPARATUS, SYSTEM AND METHOD

CROSS REFERENCE TO RELATED APPLICATIONS

The present invention claims priority under 35 U.S.C. §119(e) to United States Provisional Patent Application No. 60/294,529, filed May 30, 2001, which is herein incorporated by reference in its entirety.

FIELD OF THE INVENTION

The present invention generally relates to the field of converters, and particularly to a flexible converter suitable for providing a routing function.

BACKGROUND OF THE INVENTION

The use of electronic devices in society has become more and more pervasive as these devices become a part of everyday life. Because of the wide variety of uses, electronic devices are typically configured and optimized for operation in the contemplated environments. For example, electronic devices configured for mobile applications typically have power requirements based on conservation of power for extended operational ability while electronic devices having a readily accessible external power supply are configured for speed of operation and performance, with power efficiency being a lower consideration. However, with recent advances in electronics and power supply, users of devices in mobile operations are desirous of the full range of functionality achieved in office settings, especially as devices are configured for interoperability between mobile and office applications.

For example, preferred uses of electrical and electronic type equipment that was previously configured only for an office environment have evolved into those same uses in a "mobile" or "portable" environment. Such uses typically require a portable power source, such as a battery, solar power cell, and the like. The most conventional type of portable power sources for most mobile electric and electronic devices include a battery. Batteries may be classified broadly into rechargeable and expendable types, with a variety of electrical and physical characteristic subclasses.

In addition, batteries may not have a completely constant output over the span of a discharge cycle, which may vary greatly depending on the type of battery involved. Therefore, with the use of a battery, a variety of considerations must be addressed for efficient utilization. For example, electronic devices configured to use the power of a battery over a battery's intended discharge cycle may require a minimum supply voltage which exceeds the supply voltage requirements of the device. To determine this minimum supply voltage, a battery is typically rated at a minimum voltage level so during the life cycle of the battery, the output voltage exceeds the nominal, rated voltage level.

Some electronic circuits of electronic devices may accept excess voltage output without a problem. However, circuits of other devices may need to be protected from voltages that exceed a certain design voltage by a percentage of the nominal voltage, such as, for example, some percent or more of the rated voltage. A voltage regulating circuit may be interposed between the power terminals of an electronic device and a particular circuit element.

However, such a method may require modifying external components based on the desired power output. This obligates a manufacturer of the device to know the required and contemplated loads of devices utilizing the converter. Thus, such devices are inflexible and are designed only to provide a contemplated load.

Another method involved running at lower levels of efficiency (when the power output is not well-matched to the operating mode) such as by utilizing a fixed frequency and/or duty cycle. Low levels of efficiency are not desirable during battery operation. For example, with a portable device, such as a wireless phone, portable computer, personal digital assistant, and the like, efficient use promotes user satisfaction. Therefore, users of these devices may experience decreased operational time, may be limited in accessible features due to limited available power resources, and the like.

For example, electronic devices which include a voltage protection circuit may cause higher power batteries to perform less efficiently. If, for instance, a protection circuit is a dissipative power regulating circuit, a substantial part of the excess power may be dissipated or slowly drained by the protection circuit in effecting regulation of the supply voltage. This power drainage may significantly diminish the life cycle or discharge cycle of the respective battery, making the battery appear to be less efficient than a comparable battery requiring less regulation over its discharge cycle.

A further method involved increasing the amount of output voltage ripple depending on the load. Although voltage ripple may be acceptable in certain applications, some devices may not tolerate the voltage ripple, and may be thus susceptible to operational problems and malfunctions.

Moreover, situations may be encountered in which power must be routed between available devices, such as due to limited available power, changing device needs, and the like.

Therefore, it would be desirable to provide a flexible converter suitable for providing a routing function.

SUMMARY OF THE INVENTION

Accordingly, the present invention is directed to a flexible converter suitable for providing a routing function. A flexible converter of the present invention may provide a desired output utilizing a variety of methods, systems and apparatus without departing from the spirit and scope of the present invention.

In a first aspect of the present invention, a method includes generating a first output having a first power characteristic and a second output having a second power characteristic. The first output is provided to a first electric device and the second output is provided to a second electrical device. The first output and the second output are monitored with a comparator, the comparator suitable for measuring the power characteristic. The first output to the first electrical device and the second output to the second electrical device are routed.

In a second aspect of the present invention, a system for routing an input power supply into an output supply including a first desired output and a second desired output includes a converter, a first electrical device, a second electrical device, at least one comparator and a controller. The converter is capable of providing an output supply from an input supply coupled to the converter, the output supply capable of routing between a first output and a second output. The first electrical device is electrically connected to the first output, the first electrical device having a first power characteristic. The second electrical device is electrically connected to the second output, the second electrical device having a second power characteristic. At least one comparator is coupled to the output supply of the converter, the comparator capable of measuring the first power characteristic and the second power characteristic in relation to target power characteristics of the first electrical device and of the second electrical device. The controller is coupled to the comparator. The controller is capable of implementing a process within the converter such that the first output is routed to the first electrical device and the second output is routed to the second electrical device based on a determined initial configuration including the first power characteristic and the second power characteristic. The controller receives an indication of a change in the first power characteristic to the first electrical device. The first output to the first electrical device and the second output to the second electrical device are re-routed to provide the changed first power characteristic to the first electrical device.

In a third aspect of the present invention, a routing apparatus includes a converter, at least one comparator and a controller. The converter is capable of providing an output supply from an input supply coupled to the converter, the output supply capable of routing between a first output and a second output. At least one comparator is coupled to the output supply of the converter, the comparator capable of measuring at least one power characteristic of the first output and the second output to a first electrical device and to a second electrical device. The controller is coupled to the comparator; the controller being capable of implementing a process within the converter such that the first output is routed to the first electrical device and the second output is routed to the second electrical device. The first output and the second output are monitored with the at least one comparator and the first output to the first electrical device and the second output to the second electrical device are re-routed based upon the monitoring by the comparator.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 4 block diagrams depicting embodiments of the present invention are shown.

Figure 1:
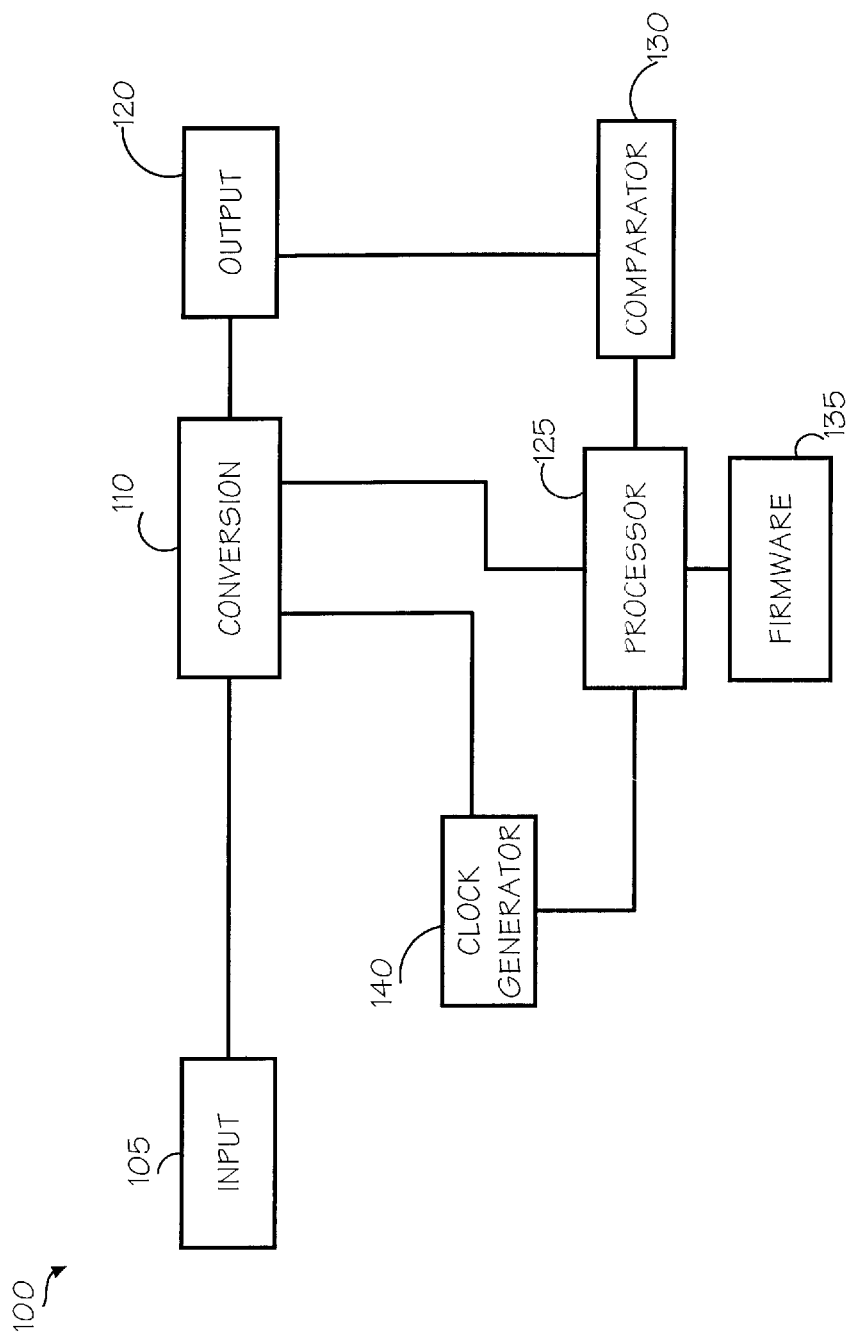
FIG. 1 is a block diagram of an exemplary embodiment of the present invention wherein a system for automatically converting a power output to a target level from an input voltage or current is shown.

Referring to FIG. 1, an exemplary embodiment of a system 100 for automatically converting a power output to a target level from an input voltage or current is shown. An input supply 105 may include an input voltage supply or input current supply. The conversion circuitry 110 may increase or decrease the input supply 105 to obtain a desired output supply 120. This may be accomplished via a processor 125 utilizing firmware 135 which may direct the operation of the components within the system 100.

A comparator 130 may be coupled to the output supply in order to compare the output supply 120 with a target output supply. The comparator 130 may be coupled with the processor 125 and firmware 135 to alert the processor of the current output supply. The processor 125 and firmware 135 of the present invention may implement processes to ensure the output supply closely resembles the target output supply. For example, the processor may be coupled with a clock generator 140. The clock generator 140 of the present invention may be capable of generating a clock with a desired frequency and a desired duty cycle. The duty cycle and frequency of the clock may control the desired effects of the conversion circuitry to manipulate the input supply into the target output supply.

A target output level may also be simply entered within the firmware 130 of the present invention. In an alternative embodiment of the present invention, the system 100 may be capable of determining a target output supply by connecting itself with a desired load. For example, a device could be connected to the output supply of the system. The system may be capable of determining the optimal power requirements for the device and providing those requirements.

Figure 2:
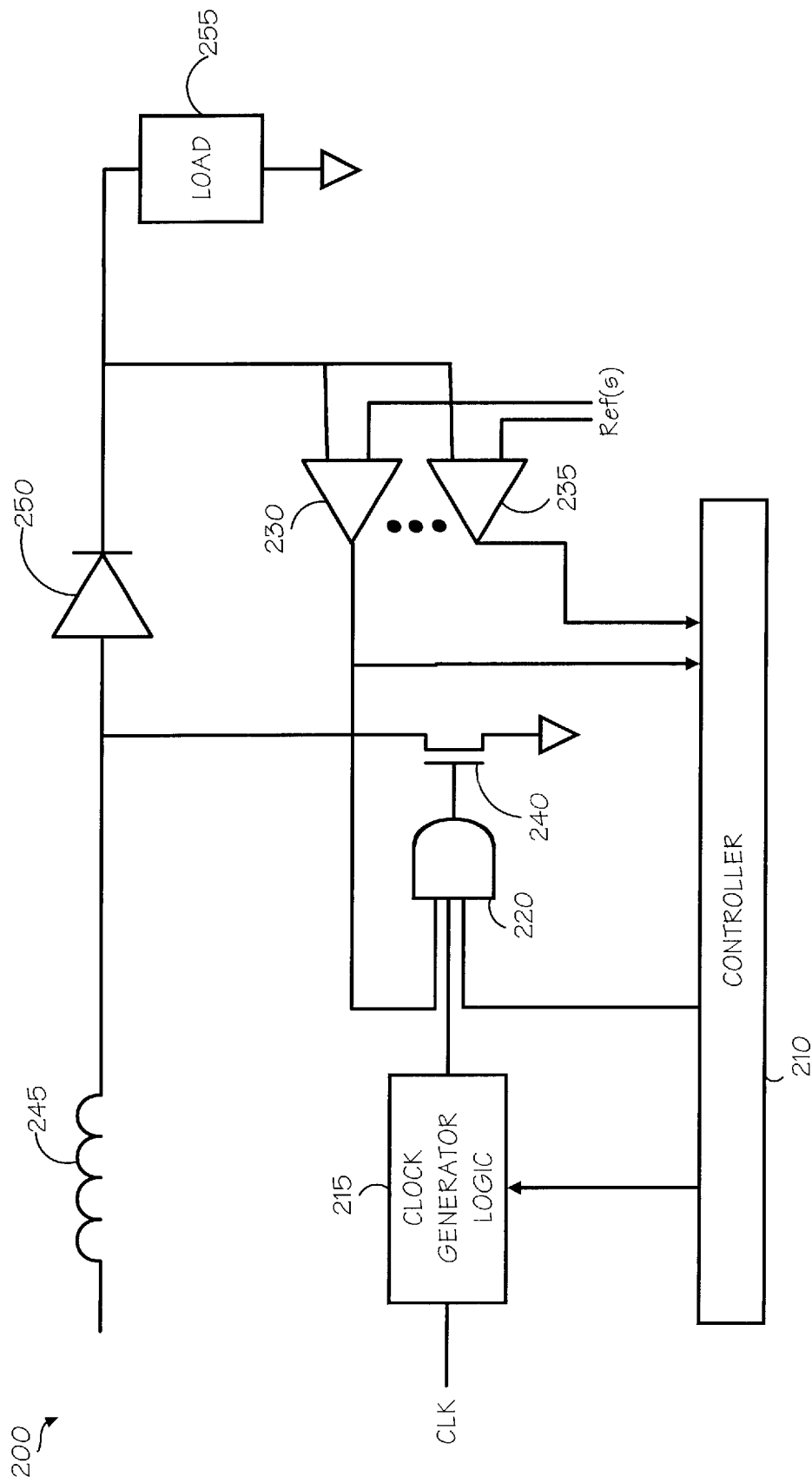
FIG. 2 is a diagram of an embodiment of the present invention wherein of a power conversion circuit in accordance with the present invention is shown.

Referring now to FIG. 2, an exemplary embodiment of a power conversion circuit 200 in accordance with the present invention is shown. A controller 210 may include a processor with firmware. Firmware utilized in conjunction with a processor may be capable of directing the operation of components within the power conversion circuit of the present invention in order to provide a desired power output. Clock generator logic 215 may be connected to the controller 210. Clock generator logic may be used in conjunction with the controller to provide a low or high output according to a desired frequency and rate. An AND gate 220 may be coupled with the clock generator logic 215, the controller 210, and at least one or more voltage comparators 230–235. If all of the inputs is "high", the output of the AND gate may be high. A "high" output from the AND gate may turn transistor 240 on.

As shown in FIG. 2 in an embodiment of the invention, transistor 240 may be a metal-oxide-semiconductor field-effect transistor (MOSFET), however one of ordinary skill in the art may substitute other types of transistors including bipolar junction transistors without departing from the scope and spirit of the present invention. When transistor 240 is on, current may increase in the inductor 245 as the inductor 245 is pulled to ground. When transistor 240 is off, current may be dumped via a diode 250 to an output load 255. The duty cycle of the clock generated by clock generator logic 215 may determine the amount of time transistor 240 is on, and thus may determine the amount of current dumped to the output load 255. By varying the duty cycle of the clock, the amount of current dumped to the output load 255 may be adjusted in order to provide a desirable output current and output voltage.

Figure 3A:
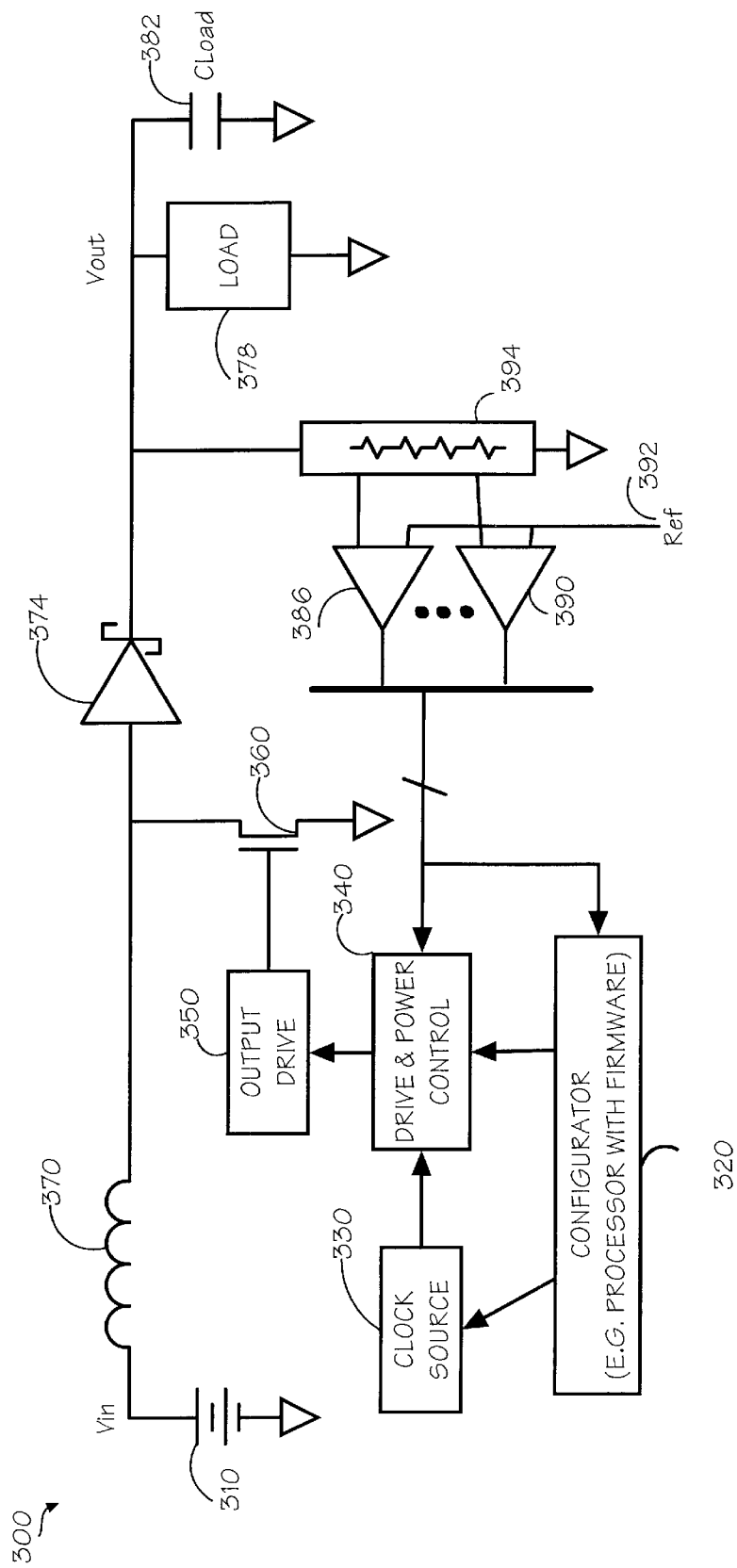
FIG. 3A is a diagram of an embodiment of the present invention employing an inductor-based converter.
Figure 3B:
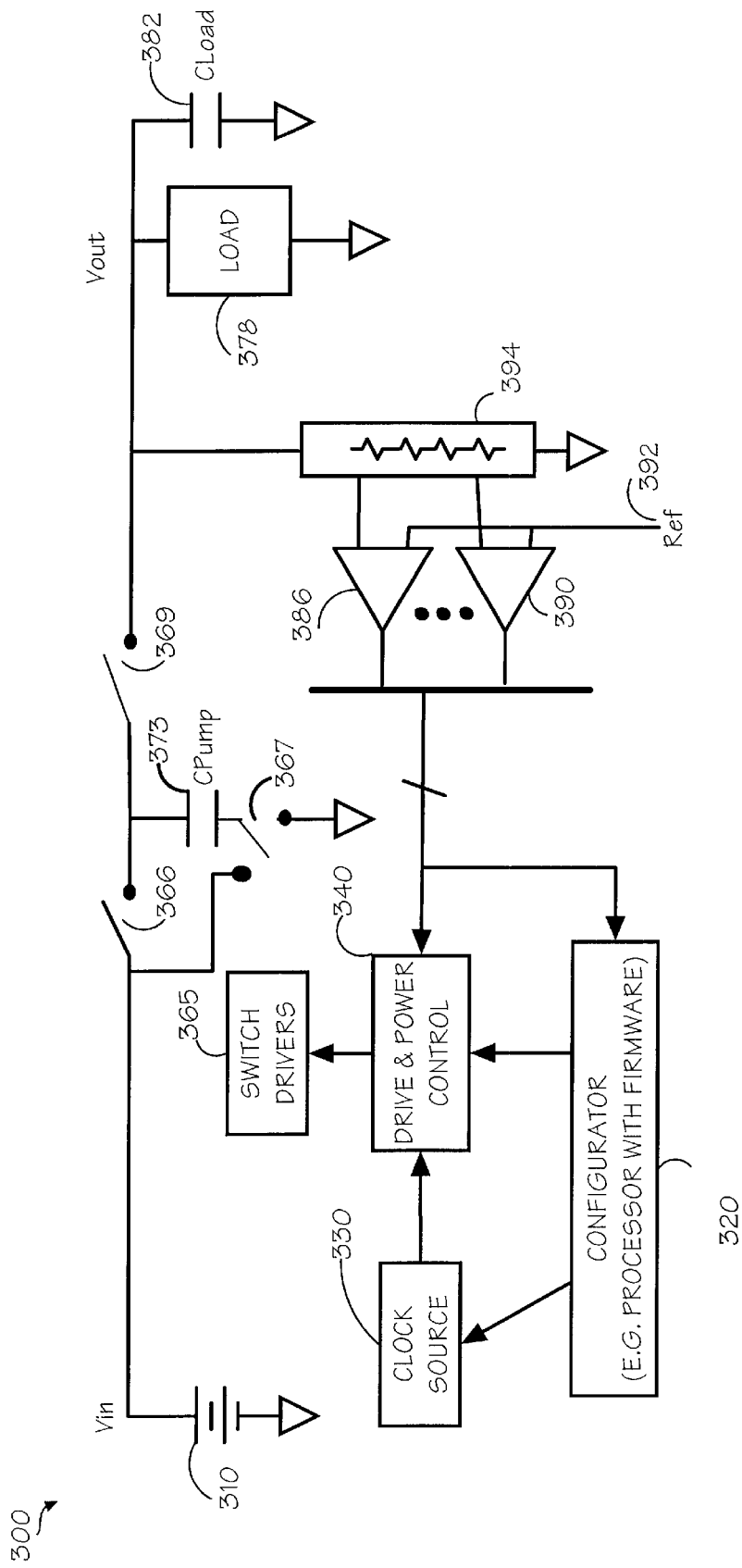
FIG. 3B is a diagram of an embodiment of the present invention employing a charge pump-based converter.

Referring to FIGS. 3A and 3B, exemplary embodiments of a power conversion circuit 300 of the present invention are shown. Power conversion circuit 300 may include alternative embodiments of implementing a system 100 for automatically converting a power output to a target level from an input voltage or current as shown in FIG. 1. FIG. 3A may depict an inductor-based converter in accordance with the present invention where FIG. 3B may depict a charge pump converter in accordance with the present invention. It should be recognized by one of ordinary skill in the art that various methods of converting a power supply exist and may be utilized in accordance with the present invention without departing from the scope and spirit of the invention. FIGS. 3A and 3B merely depict embodiments of the present invention wherein two examples of converters have been shown.

The power conversion circuit 300 as shown in FIGS. 3A and 3B of the present invention may utilize an input voltage 310 source which may provide an initial amount of current and voltage to the circuit. Through a process performed in accordance with the present invention, a desired amount of current, a desired voltage, or both may be supplied to an output device. A configurator 320 may provide an initial configuration into the power conversion circuit of the present invention. Configurator 320 may be in the form of a processor with firmware. A processor may include a variety of processors and contemplated by a person of ordinary skill in the art. A clock source 330 connected to configurator 320 may generate a clock. The clock source 330 may be capable of producing a clock operating at a specified frequency and duty cycles. Further, clock source 330 may be adjustable to allow generation of a clock with a wide frequency range and duty cycle. Variation of the frequency and duty cycle of the clock generated by clock source 330 may provide the ability to adjust a current and voltage output from the power conversion circuit of the present invention. A drive and power control cell 340 may respond to output supply level, the clock generated by clock source 330, and the power configuration settings.

In FIG. 3A, an inductor-based conversion embodiment, an output drive 350 coupled to the drive and power control cell 340 may receive input from drive and power control cell 340 to determine whether to output a low or zero voltage or output a high voltage. Output drive 350 may be implemented in one of several ways by one of ordinary skill in the art including TTL logic and transistor logic. If a high voltage is output from output drive 350, transistor 360 may be on. As shown in FIG. 3A in an embodiment of the invention, transistor 360 may be a metal-oxide-semiconductor field-effect transistor (MOSFET), however, one of ordinary skill in the art may substitute other types of transistors including bipolar junction transistors without departing from the scope and spirit of the present invention. When transistor 360 is on, current may increase in the inductor 370 as the inductor is pulled to ground. When transistor 360 is off, current may be dumped via a diode 374 to an output load 378. In a preferred embodiment, diode 374 may be a Shottky diode, however, other types of diodes may be utilized in accordance with the present invention without departing from the scope and spirit of the present invention. The duty cycle of the clock generated by clock source 330 may determine the amount of time transistor 360 is on, thus may determine the amount of current dumped to the output load 378. By varying the duty cycle of the clock, the amount of current dumped to the output load may be adjusted in order to provide a desirable output current and output voltage.

Referring to FIG. 3B, a charge pump-based conversion embodiment, switch drivers 365 coupled to the drive and power control cell 340 may receive input from drive and power control cell 340 to drive switches 366–369. Switches 366–369 may operate in combination to add or remove charge from charge pump 373 depending upon whether an output supply may need to be decreased or increased. Further, drive and power control 340 may control switch drivers 365, which in turn, may control switches 366–369, to produce a desired output supply. Other ways of implementing a charge pump-based converter may be utilized by one of ordinary skill in the art without departing from the scope and spirit of the present invention.

An advantageous aspect of the power conversion circuit 300 of the present invention as shown in both FIGS. 3A and 3B is the ability to monitor the output voltage of the power conversion circuit. One or more comparators 386–390 may be utilized to compare the output voltage with a reference voltage 392. Upon a comparison with a reference voltage, signals may be delivered to the configurator 320 and drive and power control cell 340 of the present invention. A first comparator 386 may be set at a target output voltage level with additional comparators being set at various levels above and below a target output voltage level that may indicate that the output is above or below a target output voltage level by various amounts. A resistor divider 394 may be placed between the output voltage and each of the comparators 386–390 in order to more precisely determine the value of the output voltage.

The outputs of one or more comparators 386–390 may be monitored by firmware of configurator 320. Firmware, based upon the outputs from one or more comparators 386–390 may adjust the output accordingly. For example, if the target output voltage level is too low, firmware may adjust the circuit to boost the output level. Adjustment of the operation of the circuit may be achieved by altering the duty cycle of the clock, altering the strength and size of output driver devices, or by altering the frequency of the clock.

Figure 4:
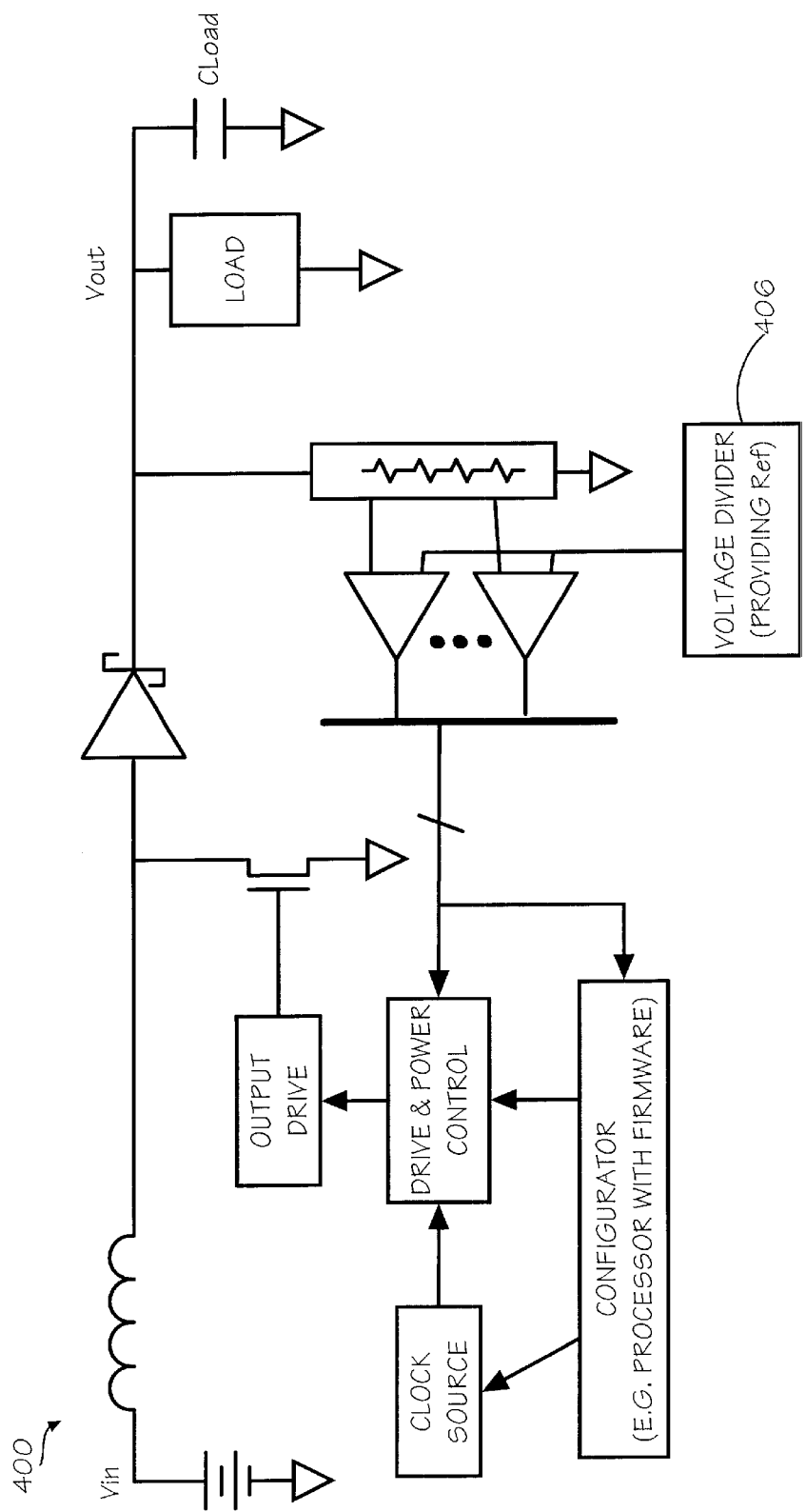
FIG. 4 is a block diagram of an embodiment of the present invention illustrating an alternate embodiment of the exemplary embodiment depicted in FIG. 3.

Referring now to FIG. 4, an alternative embodiment of the power conversion circuit 400 of the present invention is shown. The power conversion circuit of FIG. 4 is substantially similar to the power conversion circuit as shown in FIG. 3, however, an alternative embodiment of a reference voltage 406 is shown. FIG. 4 includes reference voltage 406 which may be provided utilizing a voltage divider. Utilizing a voltage divider may be advantageous as it may allow for easier adjustment of the reference voltage. For example, if the target output voltage has been changed during the course of operation, it may be beneficial to adjust the reference voltage supplied to one or more comparators to provide a more accurate determination of the value of the output voltage. However, it should be understood by one of ordinary skill in the art that other ways of providing an adjustable reference voltage exist which would not depart from the scope and spirit of the present invention.

Additionally, although an inductor-based boot converter has been described in relation to FIGS. 1 through 4, a variety of converter types are contemplated by the present invention, such as step-down buck converters, buck and/or boost converters utilizing other architectures, such as charge pumps, and the like as contemplated by a person of ordinary skill in the art.

Referring generally now to FIG. 5 through 20, exemplary methods of the present invention are shown. A flexible converter of the present invention may provide a desired output utilizing a variety of methods without departing from the spirit and scope of the present invention. The following exemplary methods should not be taken as limiting, and it should be realized elements and steps of the methods may be recombined and removed as contemplated by a person of ordinary skill in the art. Further, methods are discussed which include voltage, current, noise, signal clarity, duty cycle, frequency, and the like. It should be realized methods discussed and claimed contemplate additional power characteristics, and further methods discussed contemplating a single power characteristic are to be taken to include other power characteristics as stated and as contemplated by a person of ordinary skill in the art without departing from the spirit and scope of the present invention.

Figure 5:
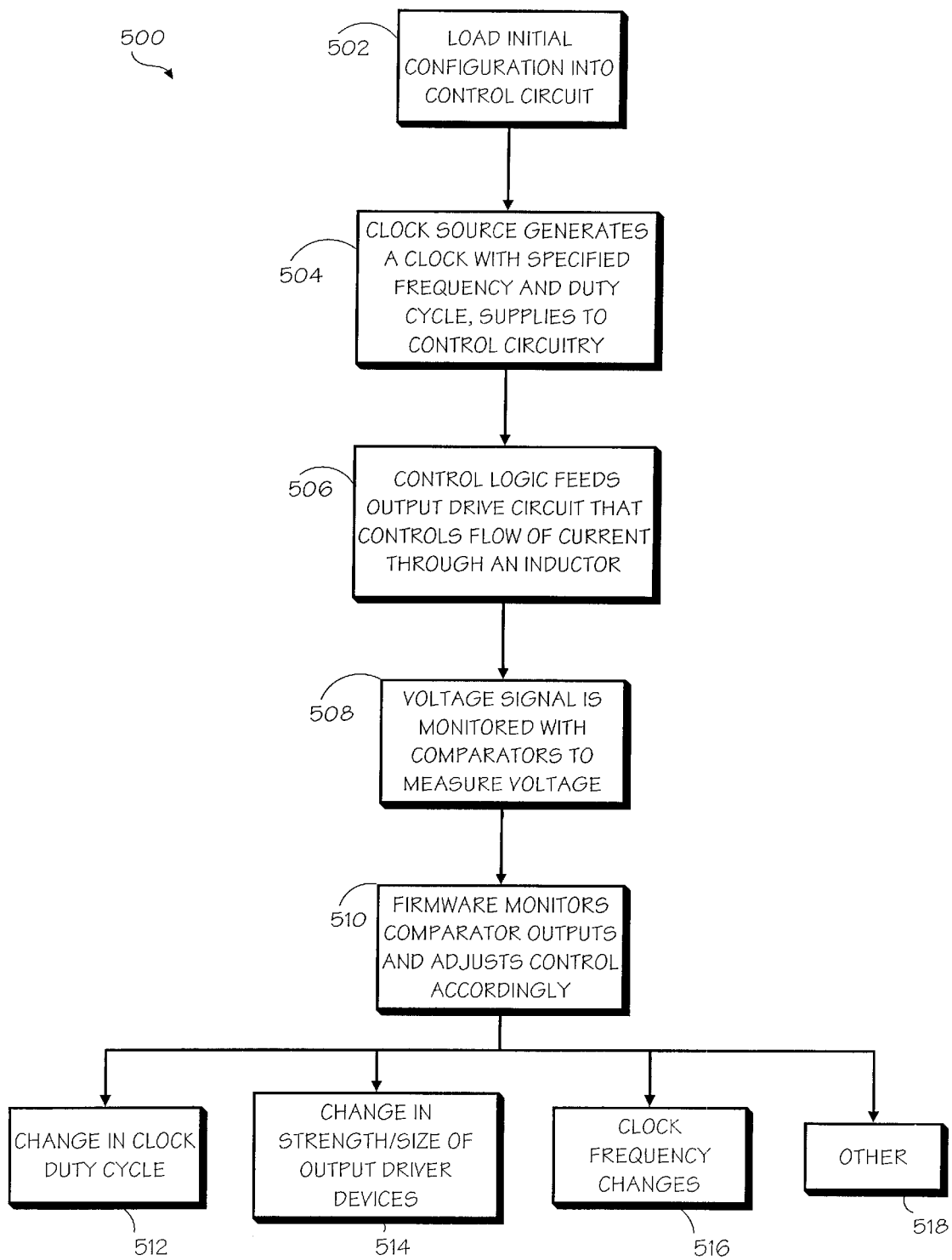
FIG. 5 is a flow diagram depicting an exemplary method of the present invention in which a voltage converter including control logic is monitored and output adjusted based on monitored performance.

Referring now to FIG. 5, an exemplary method 500 of the present invention is shown wherein a voltage converter including control logic is monitored and output adjusted based on monitored performance. An initial configuration is loaded into a control circuit 502 of a voltage converter, such as the voltage converters shown in FIGS. 1 through 4. For example, a clock source generates a clock with a specified frequency and duty cycle 504, and supplies the signal to control circuitry. The control logic feeds an output drive circuit controlling flow of current through an inductor 506, such as an external inductor. The voltage signal is monitored with comparators to measure the outputted voltage 508. Thus, firmware operating a processor of the voltage converter may monitor comparator outputs and adjust control accordingly 510. For example, a change in clock duty cycle 512 may be performed, change in strength/size of output driver devices 514, clock frequency changes 516, and other 518 changes as contemplated by a person of ordinary skill in the art, such as a combination of the previous changes, additional changes, and the like.

Figure 6:
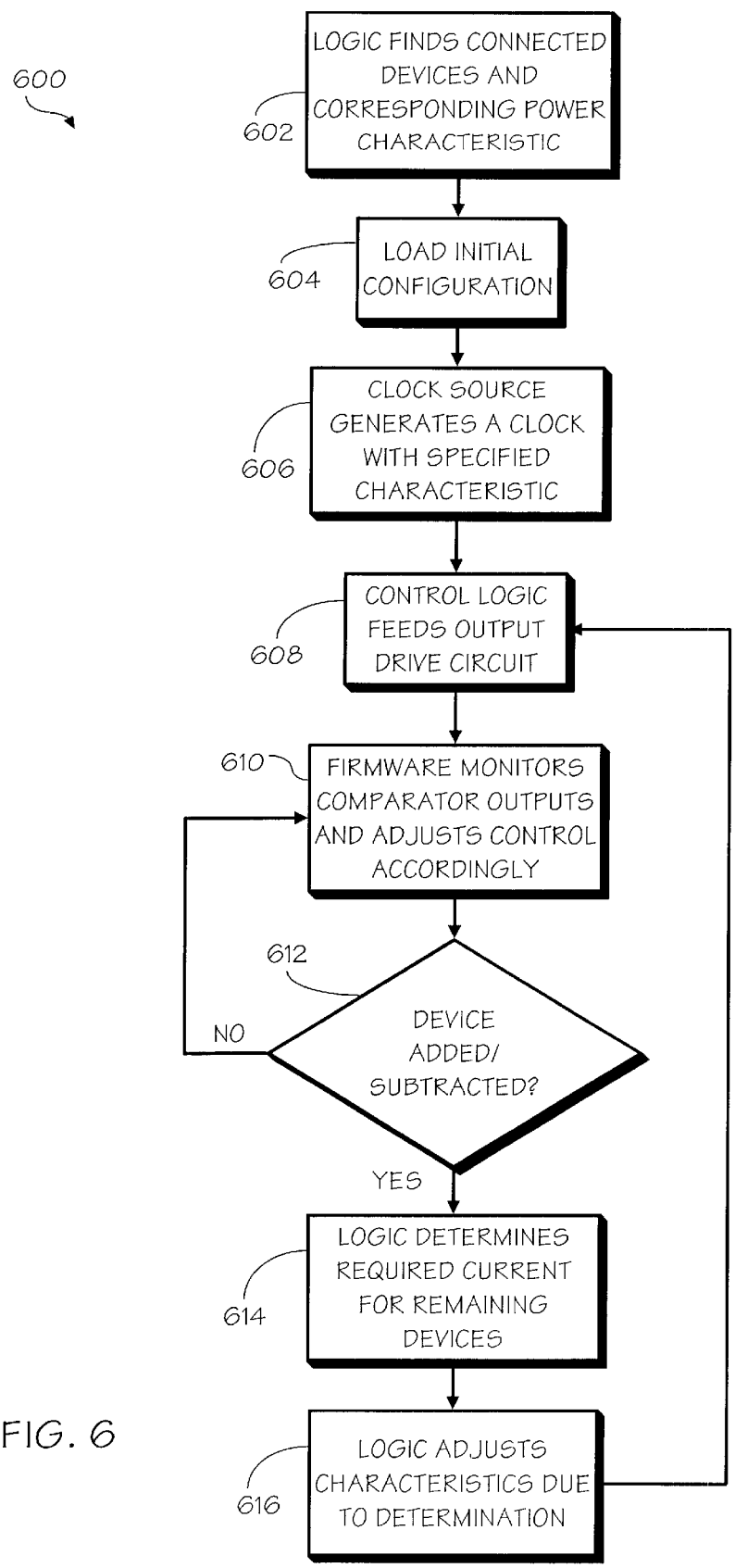
FIG. 6 is a flow diagram illustrating an exemplary method of the present invention wherein logic of a converter finds connected devices, determines corresponding power characteristics, monitors for changes based on addition/subtraction of devices, and adjusts accordingly.

Referring now to FIG. 6, an exemplary method 600 of the present invention is shown wherein logic of a converter finds connected devices, determines corresponding power characteristics, monitors for changes based on addition/subtraction of devices, and adjusts accordingly. For example, device logic finds connected devices and corresponding power characteristics 602. Consequently, logic may communicate through a connected bus and bus protocols to determine the characteristics of a connected device, may identify a connected device and query a database of device characteristics, and the like. An initial configuration is loaded 604 based on the found characteristics. For instance, a clock source may generate a clock signal with specified characteristics 606. The control logic then feeds the output drive circuit 608 to provide a corresponding power characteristic for the found connected devices. Firmware, as implemented through a processor, controller, and the like, monitors comparator outputs and adjusts control accordingly 610. For instance, if the current needs of devices change, the output of the converter may be adjusted.

Additionally, if a device is added or subtracted to a system utilizing the converter, additional adjustments may be needed. For example, if a device is added and/or subtracted 612 to an output of a converter circuit of the present invention, logic may determine the required power characteristics for the remaining devices 614 and adjust characteristics based on the determination 616. For example, a current conversion circuit may identify the type of device added utilizing bus protocols, such as universal serial bus (USB), and the like, and determine the desired current based on a corresponding entry in a look-up table. Further, a current conversion circuit may identify through a bus protocol the action of adding and/or deleting a device from the circuit, and thus reinitiate monitoring of the circuit for desired changes.

Figure 7:
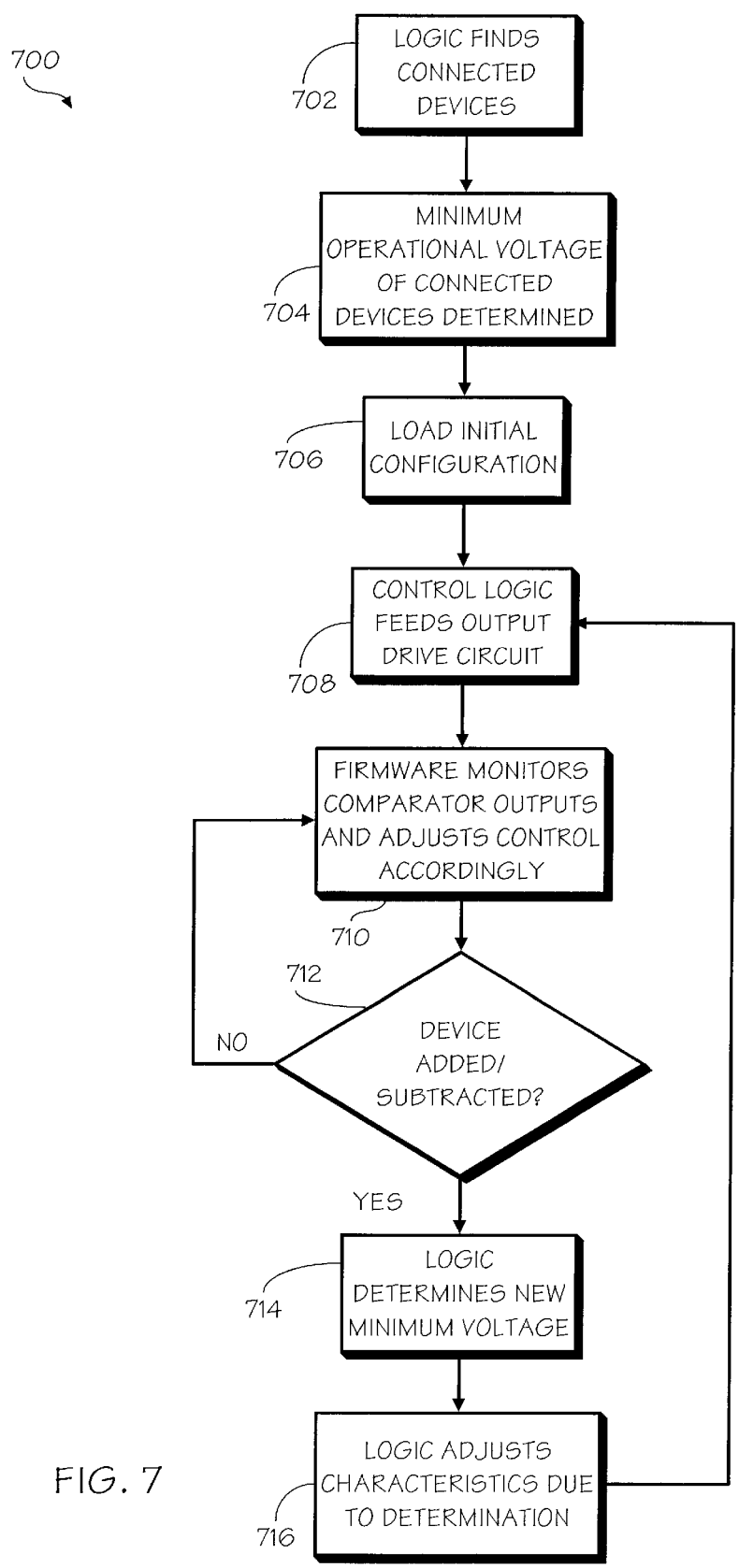
FIG. 7 is a flow diagram illustrating an embodiment of the present invention wherein logic of a converter adjusts output to a minimum level for connected devices.

Referring now to FIG. 7, an exemplary method 700 of the present invention is shown wherein logic of a converter adjusts output to a minimum level for connected devices. Logic of a converter, such as a voltage converter, finds connected devices 702. A minimum operational voltage of the connected devices is determined 704. Determining a minimum operational voltage may include utilizing a previously stored value for operational voltage encountered, a preprogrammed initial voltage, and the like.

An initial configuration is then loaded 706 based on the determined minimum operational voltage. Control logic then feeds the output drive circuit 708. Firmware monitors comparator outputs and adjusts control accordingly 710. For example, even though a minimum operational voltage was determined, due to operational characteristics that may be encountered by the connected devices, such as a power-saving mode, high-power performance mode, and the like, it may be desirable to reconfigure output of the voltage converter to correspond to the changing conditions.

Additionally, if a device is added and/or subtracted 712, such as the replacement of an existing connected device with another device, it may be necessary to reconfigure the output. Thus, the logic may determine a new minimum voltage 714 and adjust characteristics due to the determination 716. For example, a device may be replaced on an interface with a device having different power requirements, such as a powered connection to a first device as opposed to a connection which is un-powered, such as a pure data transfer connection. Therefore, the voltage output may be reconfigured for the change.

Figure 8:
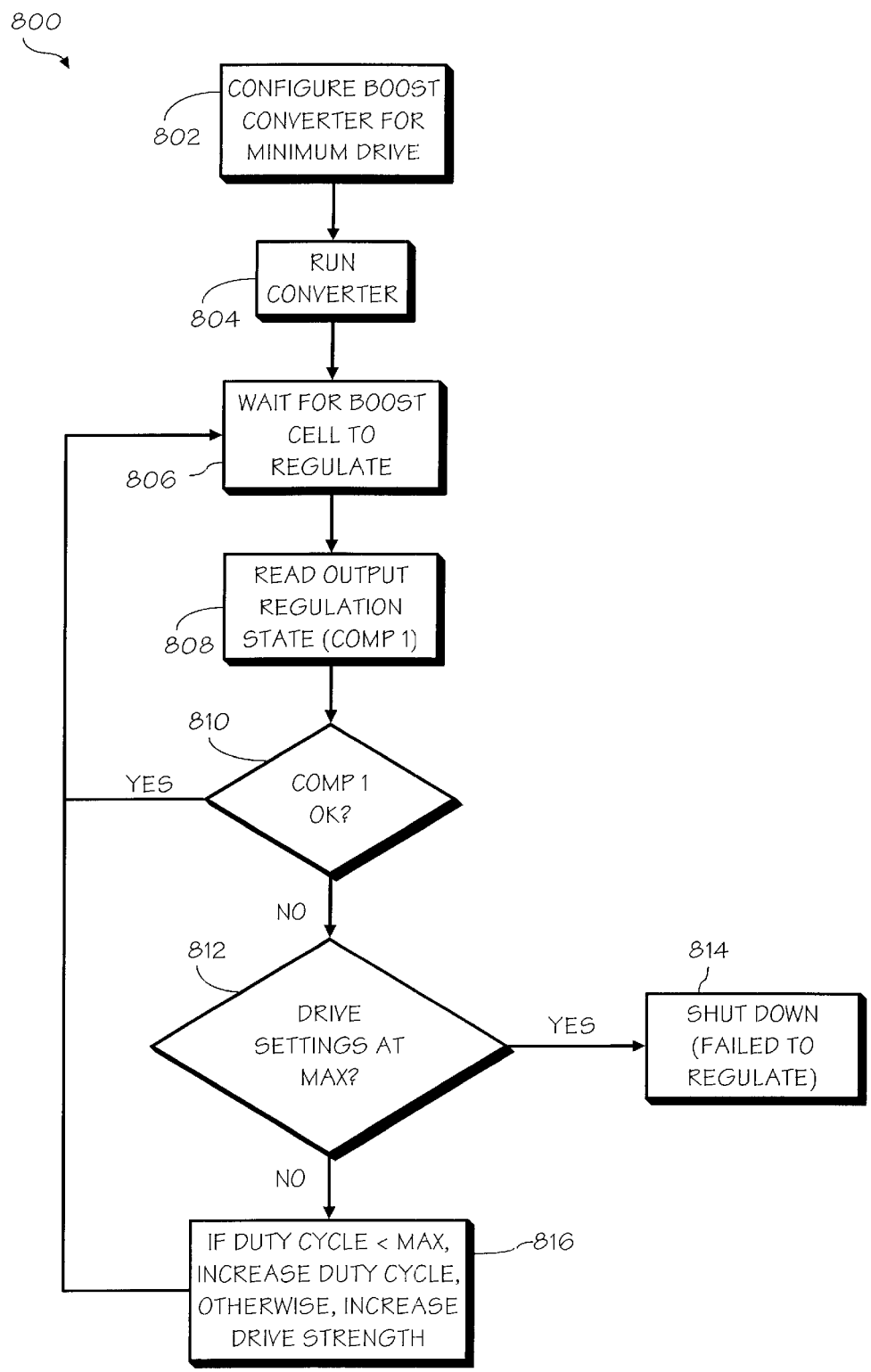
FIG. 8 is a flow diagram of an exemplary method of the present invention in which a single comparator is utilized to determine a target output duty cycle and drive strength.

Referring now to FIG. 8, an exemplary method 800 of the present invention is shown wherein a single comparator is utilized to determine a target output duty cycle and drive strength. A converter, configured as a boost converter, is configured for minimum drive operation 802, such as by employing a minimum duty cycle, minimum drive output, and the like. The converter begins operation 804, and reaches a regulated state 806. A first comparator reads an output regulated state 808. If the regulated state is acceptable 810, such as within normal operating range for connected devices, no changes are made, and monitoring continues. However, if the regulated state is not within normal operating range for a connected device, a determination is made as to whether the drive settings are at the maximum level 812. If the drive settings are at maximum, the converter may be shut down 814 for failure to regulate. However, if the drive settings are not at the maximum level 812, and if duty cycle is lower than the maximum duty cycle, the duty cycle may be increased, the drive strength may be increased 816, and the like. Thus, power efficient operation of a converter may be achieved, such as by increasing efficiency by configuring a boost cell to supply the smallest (or weakest) drive setting that properly supplies the desired load.

Figure 9:
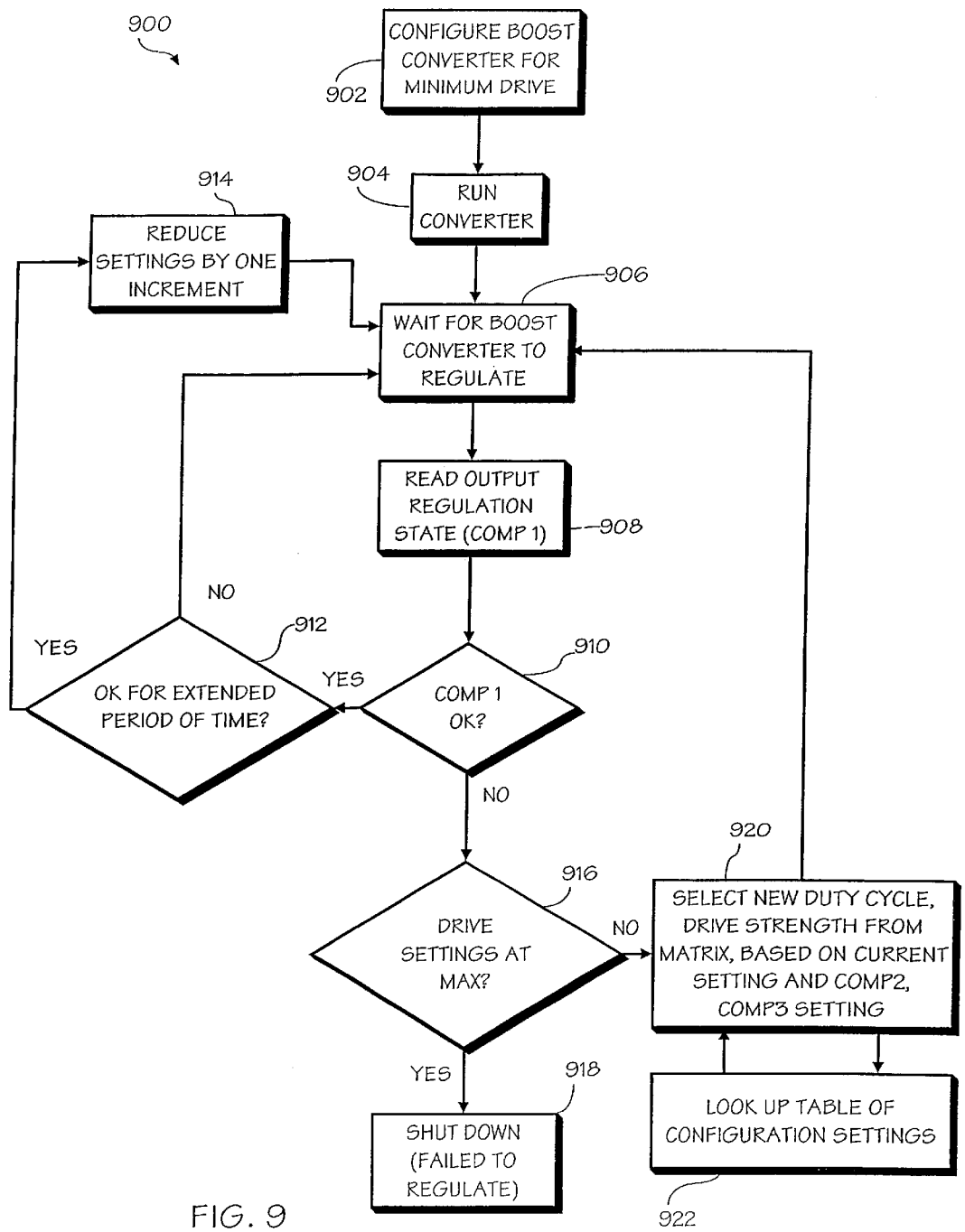
FIG. 9 is a flow diagram depicting an embodiment of the present invention wherein a voltage converter configured as a boost converter monitors output for operation of extended periods of time to maximize efficiency.

Referring now to FIG. 9, an embodiment 900 of the present invention is shown wherein a voltage converter configured as a boost converter monitors output for operation of extended periods of time to maximize efficiency. A boost converter is configured for minimum drive operation 902, such as by setting the duty cycle and output drive to minimum operational values, and operation of the converter is begun 904. After the boost converter has regulated 906, the output regulated state is read at a first comparator 908. In this example, the first comparator is configured to "trip" at a target output voltage.

If the first comparator is within range of the target output voltage 910, a determination is made if the output is acceptable for an extended period of time. For example, periodic sampling may be made to determine if the device and/or output of the voltage converter is within a specified range, what trends in output are occurring which are undesirable, and the like. If device operation and/or output voltage is not within range of the target output voltage for an extended period of time 912, monitoring may continue. However, if a determination is made that operation may continue for an extended period of time 912, drive settings are reduced by one increment 914 (which contemplates an infinite range of movement). For instance, a duty cycle, drive strength, a combination of duty cycle and drive strength, and the like may be reduced as contemplated by a person of ordinary skill in the art.

If the first comparator is not within range of the target output voltage 910 as indicated by the first comparator, a determination is made as to whether the drive settings are at maximum 916. If the drive settings are at maximum, the voltage converter may shut down 918 for failure to regulate, thereby preventing damage to connected devices, the circuit itself, a host system, and the like. If the drive settings 25 are not at maximum (or optimum), a second drive strength may be selected from a matrix based on current settings and additional comparator indications. For example, a second comparator may be configured to "trip" at a voltage which is 95 percent of the target voltage and a third comparator may be configured to "trip" at a voltage which corresponds to 90 percent of the target voltage 920. The output from the first comparator, second comparator and third comparator may thus be utilized in conjunction with a look up table of configuration settings 922 to determine a new configuration, such as converter settings, for the voltage converter. Thus, efficiency may be optimized by continuously turning drive levels down, i.e. reducing power requirements, if possible.

Figure 10:
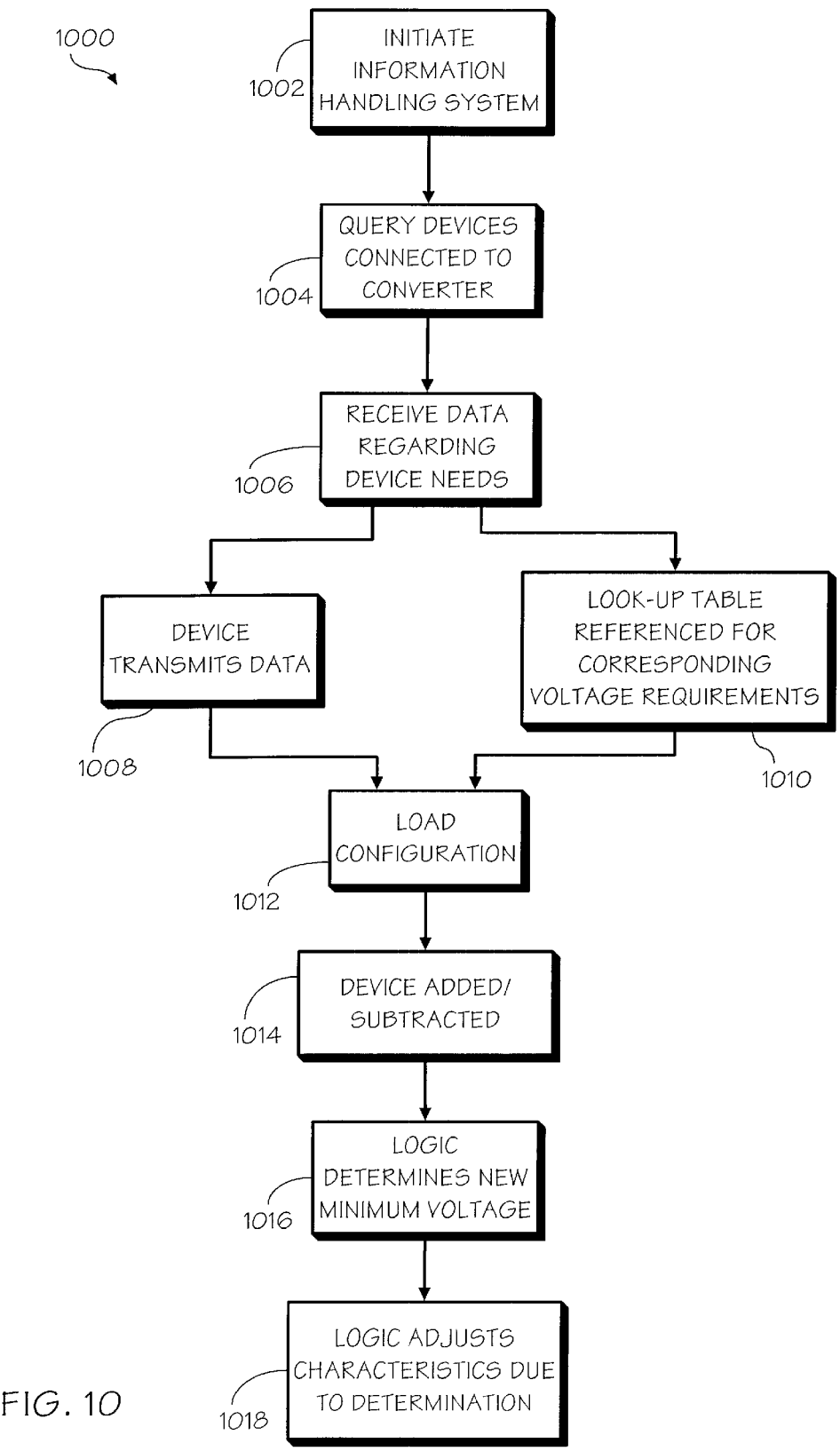
FIG. 10 is a flow diagram illustrating an exemplary method of the present invention wherein an information handling system including a converter of the present invention configures output of a converter based on data received from devices coupled to the voltage converter.

Referring now to FIG. 10, an exemplary method 1000 of the present invention is shown wherein an information handling system including a converter of the present invention configures output of a converter based on data received from devices coupled to the voltage converter, the devices utilizing the converter output. An information handling system is initiated 1002, such as by performing a "warm" or "cold" boot. Electronic devices connected to the converter are queried 1004. The converter then receives information regarding voltage needs 1006. For example, a device may receive the query, and transmit data regarding power needs 1008, such as voltage, current, duty cycle, and the like. Additionally, a device may return a device identifier, which is referenced in a look-up table for corresponding requirements. Such referencing may be performed by a converter of the present invention, information handling system, and the like 1010. Further, a desired power characteristic may be based on calculations and other methods as contemplated by a person of ordinary skill in the art.

The configuration is then loaded 1012 and operation commences. Therefore, if a device is added and/or subtracted 1014, a new determination of power requirements may be made. For example, logic may determine a new minimum voltage 1016 based on, for example, a referenced look-up table indexed by device type, so that the logic may adjust the output characteristics based on the determination 1018. In this way, a determination of optimum power characteristics may be made based on device identifiers as referenced in a look-up table; actual transmittal of device requirements by the device itself; made based on device identifiers as referenced in a look-up table by an information handling system, the table either located locally on the information handling system or accessible over a network; and the like as contemplated by a person of ordinary skill in the art. Additionally, it is contemplated the power supply of the present invention may monitor load and adjust supply accordingly.

Figure 11:
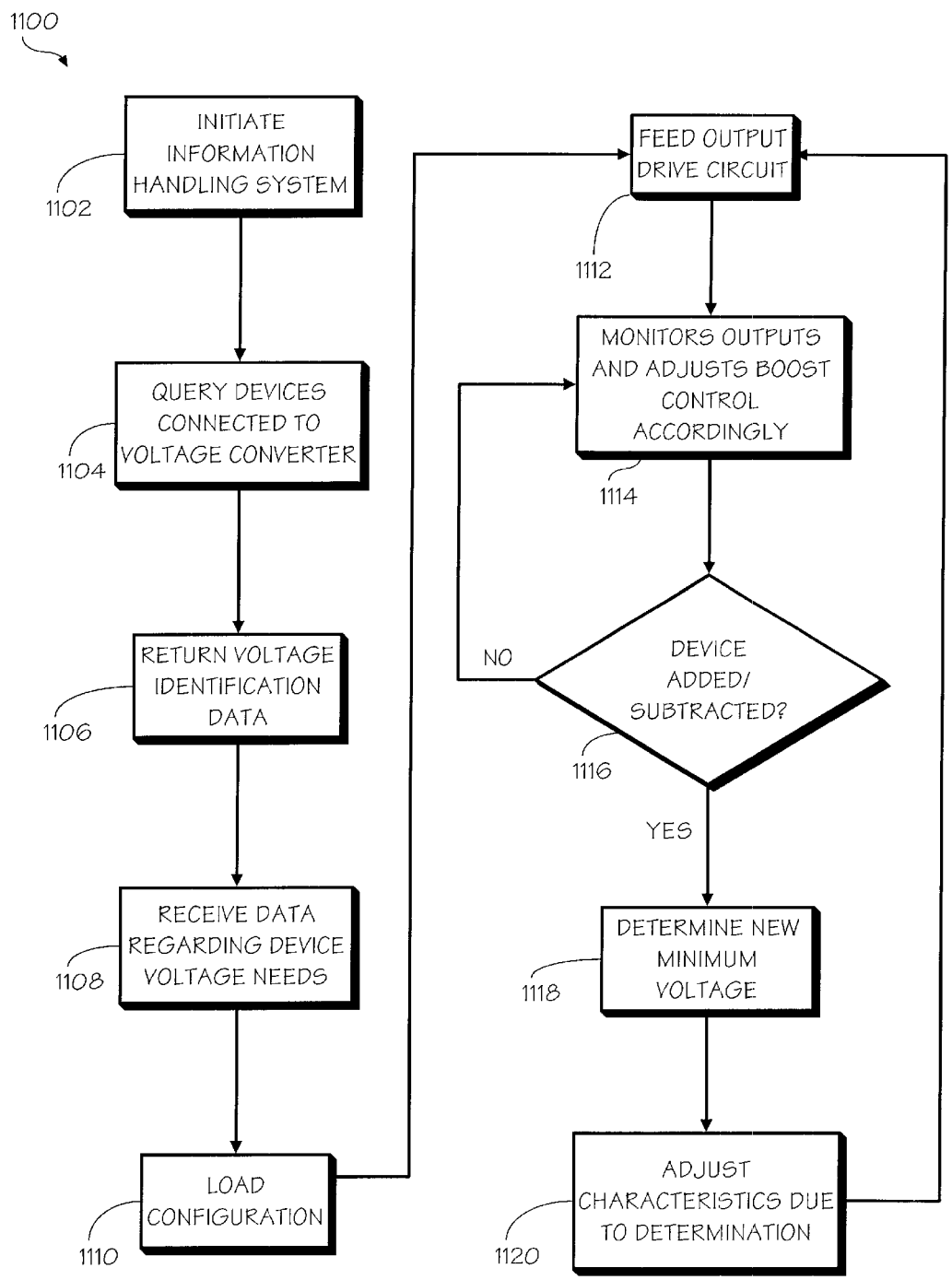
FIG. 11 is a flow diagram depicting an exemplary method of the present invention in which an initial output of a voltage conversion circuit is determined based on identified devices and is monitored for further optimization of power efficiency.

Referring now to FIG. 11, an exemplary method 1100 of the present invention is shown wherein an initial output of a voltage conversion circuit is determined based on identified devices and is monitored for further optimization of power efficiency. An information handling system, such as a desktop computer, server, internet appliance, personal digital assistant, convergence system, and the like, is initiated 1102. Devices connected to a voltage converter are queried 1104. The devices receive the query, and return data regarding device voltage needs 1106, such as device identifiers, voltage requirement values, and the like. The voltage converter then receives data regarding device voltage needs 1 108, such as receipt of a corresponding entry from a look-up table, and loads the configuration 1110 such that the output drive circuit may be implemented 1112 at an initial level.

The voltage converter then monitors output and adjusts boost control accordingly 1114, such as through the use of comparators, receipt of an interrupt, and the like. If a device is added and/or subtracted 1116, a new minimum voltage may be determined 1118 based upon the identified devices. Further, if a device is subtracted, i.e. disconnected from the voltage converter, the voltage converter may adjust the output 1120 based upon the derivation of the initial value. For example, a voltage converter may determine each device has certain voltage requirements, and then utilize those requirements to determine a target voltage. If the voltage converter stored those values, then if a device is disconnected from the voltage converter, the voltage converter may utilize the preexisting information without requiring the access of a look-up table. Thus, if the look-up table was implemented as a database over a network connection; stored in local memory in an information handling system, such as in memory accessible over a bus and located "off-chip"; and the like, the device may efficiently determine an optimal voltage.

Figure 12:
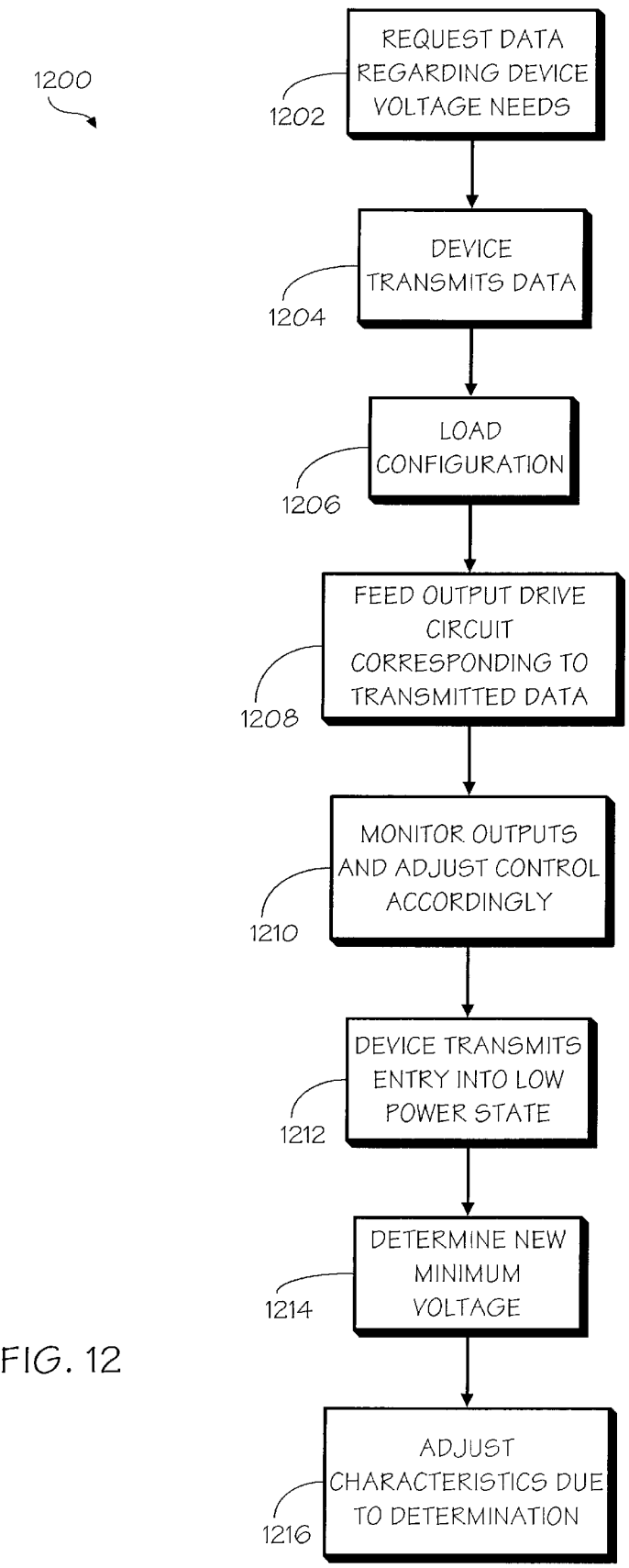
FIG. 12 is a flow diagram of an exemplary embodiment of the present invention wherein a voltage converter, after reaching a regulated state based on data received from connected devices, recalibrates due to devices entering a power conservation state.

Referring now to FIG. 12, an exemplary method 1200 of the present invention is shown wherein a voltage converter, after reaching a regulated state based on data received from connected devices, recalibrates due to devices entering a power conservation state. A request is made for data regarding device voltage needs 1202. The device transmits data 1204, and a voltage conversion circuit 1206 loads a configuration corresponding to the device voltage needs. The output drive circuit of the voltage converter is then fed in a manner corresponding to transmitted data 1208. The voltage conversion circuit then monitors outputs and adjusts the controls accordingly 1210.

For example, a device may enter into a low power state to conserve power, such as in a mobile application, sleep mode, due to inactivity of the device for a specified period of time, and the like. The device, when entering the low power mode, may transmit an identifier indicating entry into a low power state 1212. Logic may then be utilized to determine a new minimum voltage 1214, preferable a voltage which will supply the voltage required to operate the devices in an efficient manner. The characteristics of the voltage conversion circuit may then be adjusted due to the determination 1216, such as by adjusting the duty cycle, clock cycle, and the like.

Figure 13:
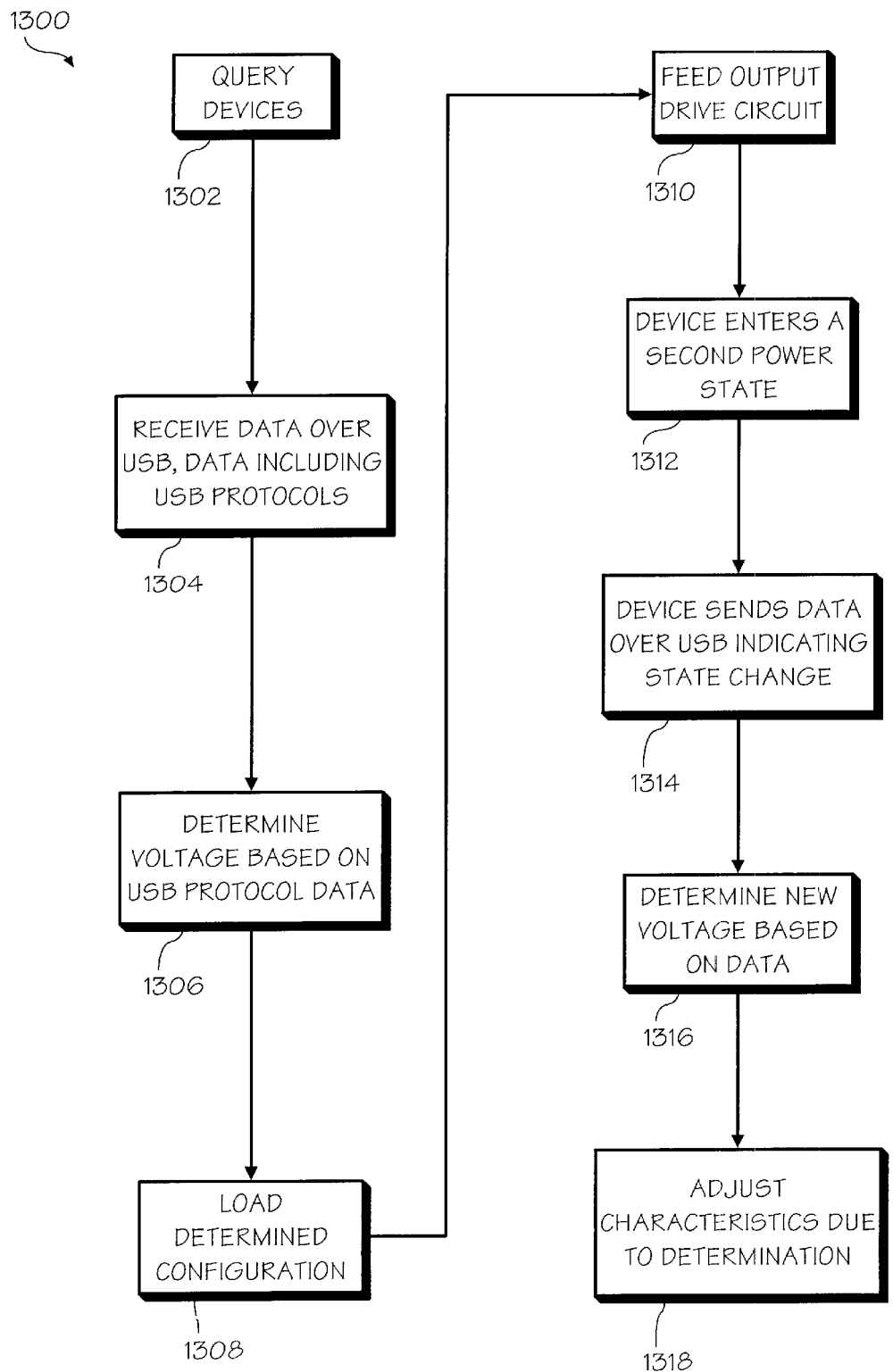
FIG. 13 is a flow diagram of an exemplary method of the present invention in which a voltage converter included in a USB interface utilizes protocol data to determine power needs of connected devices.

Referring now to FIG. 13, an exemplary method 1300 of the present invention is shown wherein a voltage converter included in a USB interface (or the like interface, such as IEEE 1394, SCSI, and others) utilizes protocol data to determine power needs of connected devices. Devices connected to a converter over a universal serial bus (USB) interface are queried 1302. Data is received from the devices over the USB interface, the data including USB protocols 1304. For example, a desired power characteristic may be determined based on USB protocol data 1306 or the like. The USB protocol data may indicate the identity of a device, which may then be utilized in conjunction with a look-up table, database, and the like to determine the desired power level and/or range of the device, such as a voltage and/or amplifier level, may receive an identifier which indicates the desired power characteristics directly without requiring use of a look-up table, and the like as contemplated by a person of ordinary skill in the art. The determined configuration is then loaded 1308 and utilized to feed the output drive circuit 1310.

If a device enters a second power state 1312, the device may send data over the USB indicating state change 1314. For example, the device may enter a low power state, may enter a higher performance state in which greater power demands are encountered, and the like. Thus, the present invention may determine a new voltage based on the data 1316, and adjust characteristics based on the determination 1318. In this way, the present invention may react to different power needs without waiting to encounter the actual state change through monitoring the outputs, thereby permitting greater reaction time and improved efficiency.

Figure 14:
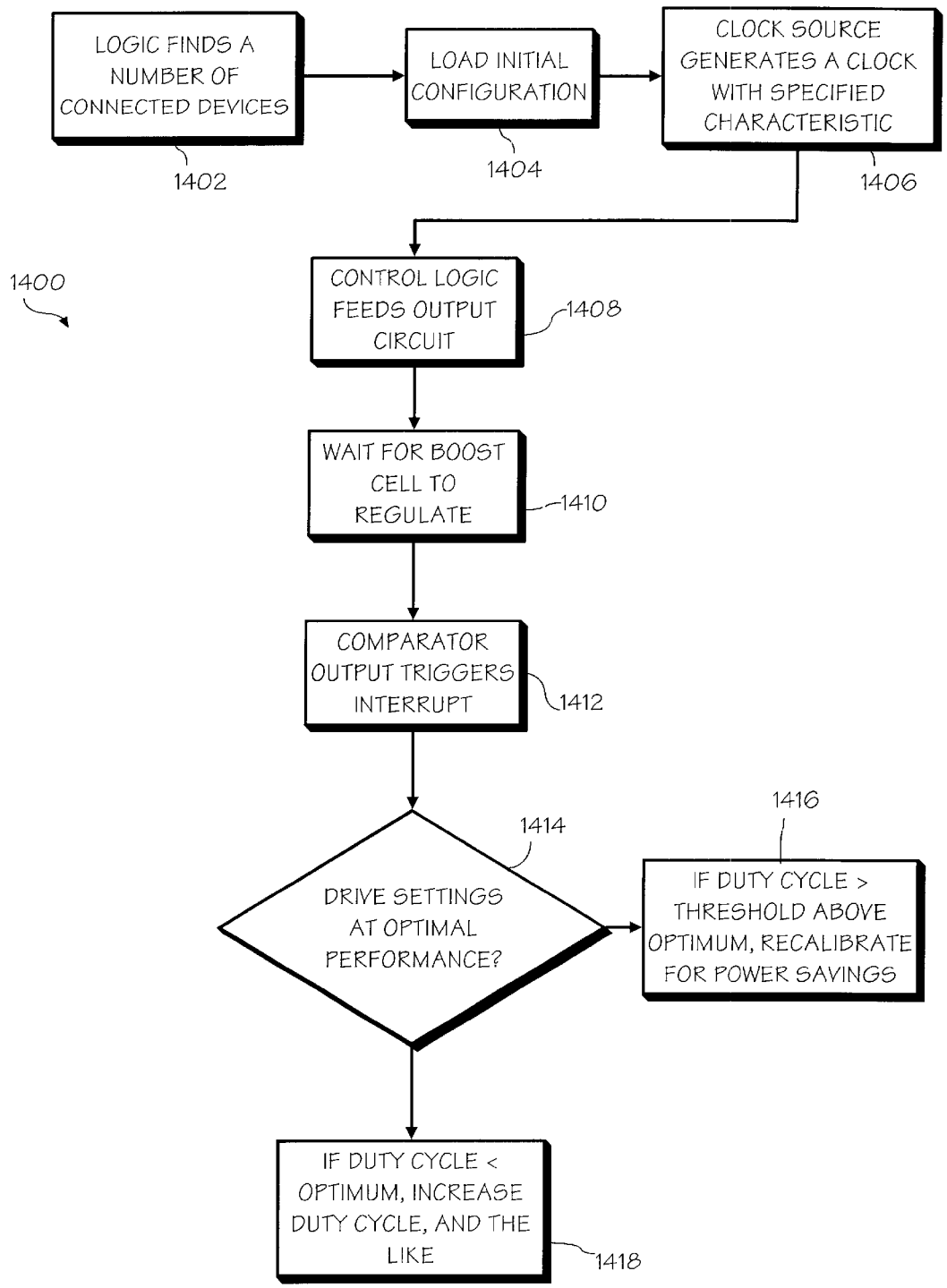
FIG. 14 is a flow diagram illustrating an exemplary method of the present invention wherein a comparator output of a voltage converter is utilized to trigger an interrupt.

Referring now to FIG. 14, an exemplary embodiment 1400 of the present invention is shown wherein a comparator output of a voltage converter is utilized to trigger an interrupt. Logic finds a number of connected devices 1402 and loads an initial configuration based on the found number 1404. For example, logic may determine that an "N" number of devices are connected to a circuit of the present invention, and may thus utilize this number to configure the power characteristics. For example, a clock source may generate a clock with a specified characteristic 1406. The control logic may then feed an output circuit 1408. After the circuit and the device have regulated 1410, operation of a comparator may be initiated. The comparator is configured to trigger an interrupt at an output power level 1412.

For example, a plurality of comparators may be included, each of which is triggered at a differing power characteristic, such as current, voltage, noise level, signal clarity, and the like. The differing levels may be utilized by the logic to determine the output power characteristics, and may therefore change the characteristics as desired. For instance, a determination may be made if the drive settings are at optimal performance 1414, such as if a duty cycle is above or below a threshold above optimum. If the duty cycle is above a threshold above optimum performance, the drive settings may be recalibrated for power savings 1416. However, if the duty cycle is below optimum, the duty cycle may be increased 1418 to correspond to the optimum performance characteristics. Thus, interrupts may be utilized by logic of the present invention to optimize performance of the converter.

Figure 15:
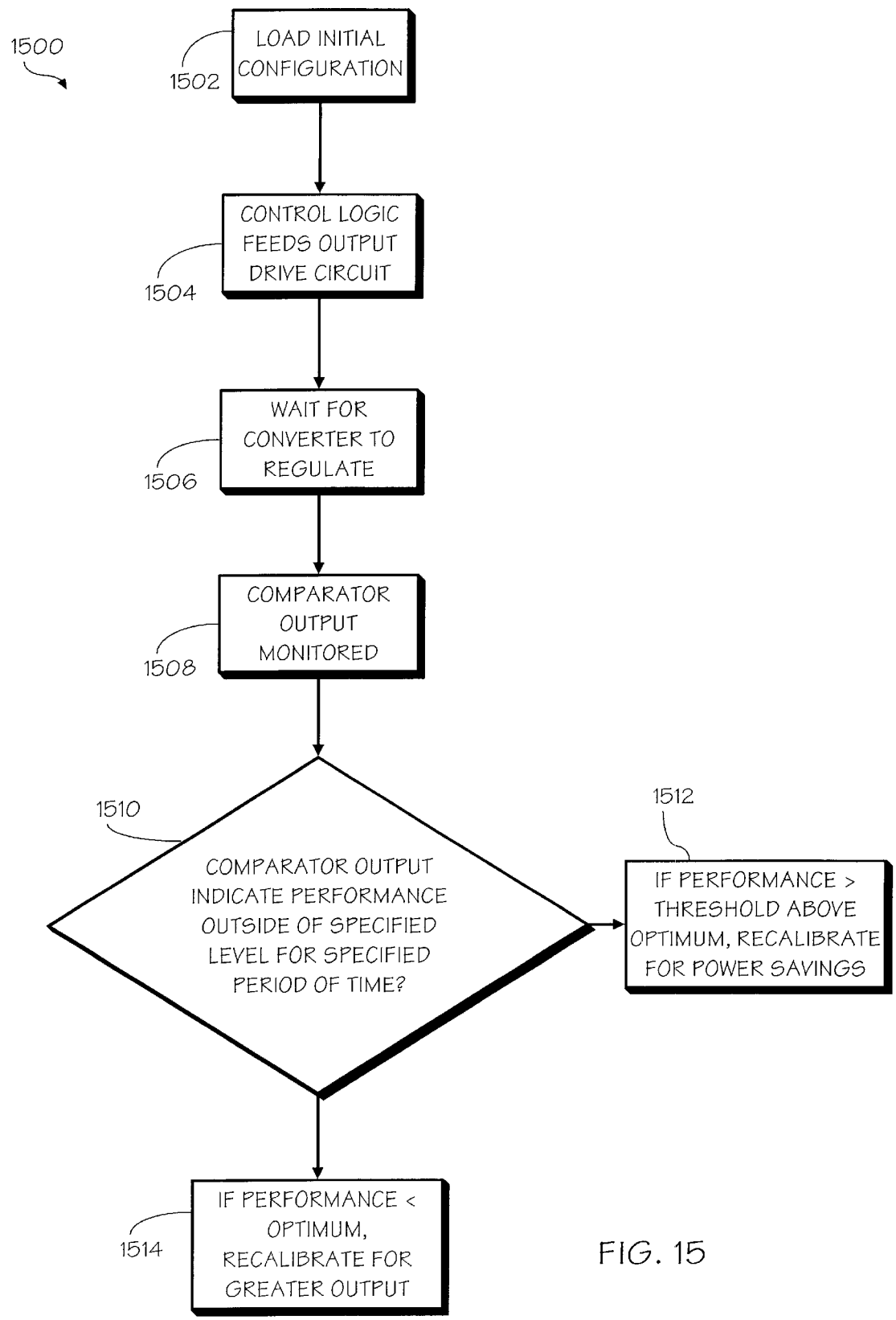
FIG. 15 is a flow diagram of an exemplary method of the present invention wherein a comparator is utilized to indicate power level operation outside of a performance level for a specified period of time.

Referring now to FIG. 15, an exemplary method 1500 of the present invention is shown wherein a comparator is utilized to indicate power level operation outside of a performance level for a specified period of time. In some instances it may be desirable to reconfigure power output, such as current, voltage, noise, signal clarity, duty cycle, frequency, and the like, after a specified period of time rather that being triggered when a certain power condition is encountered, such as operation outside of a threshold, and the like. For example, an initial current configuration of a current converter of the present invention may be loaded 1502. Control logic of the current converter may feed an output drive circuit 1504 so as to correspond with the initial configuration. Once the cell has regulated 1506, a comparator output may be monitored 1508, such as through constant monitoring, the use of interrupts, and the like.

If comparator output indicated performance outside of a specified level for a specified period of time 1510, actions may be taken by the logic to restore performance to desired levels. For example, if the performance level is greater than a threshold indicated optimum performance, the current converter may be recalibrated for power savings 1512. Likewise, if output performance is indicated which is below a threshold, such as a threshold indicating minimum operational power, the current converter may be recalibrated for increased output 1514 within a threshold range. In this way, anomalies encountered by a converter, and subsequent undesirable actions taken, may be diminished through the verification an encountered state is outside of a threshold.

Figure 16:
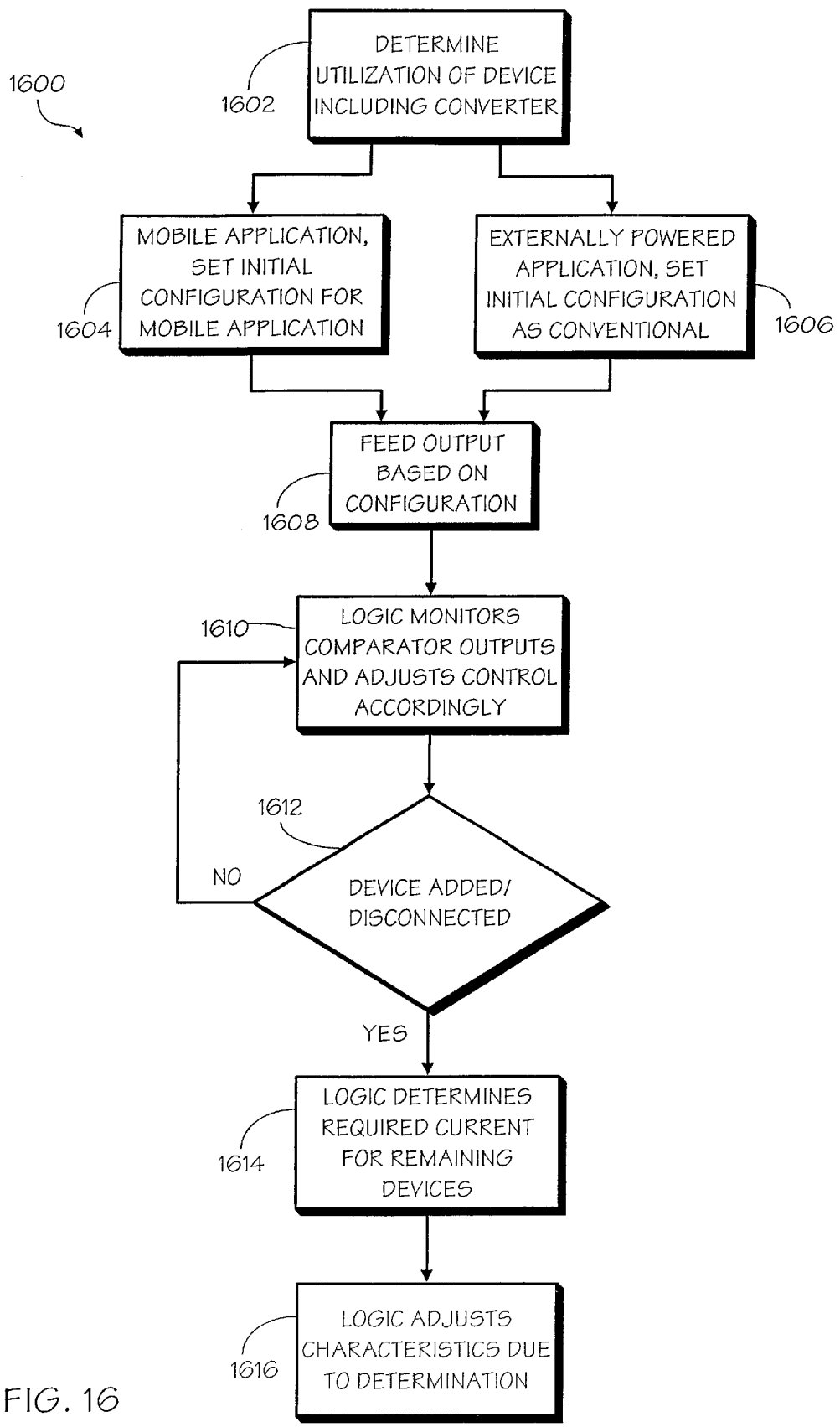
FIG. 16 is a flow diagram of an exemplary embodiment of the present invention wherein a converter included in a USB interface is suitable for supporting a first current output corresponding to a standard USB current output and a second current output suitable for supporting mobile applications.

Referring now to FIG. 16, an exemplary method 1600 of the present invention is shown wherein a converter included in a USB interface is suitable for supporting a first current output corresponding to a standard USB current output and a second current output suitable for supporting mobile applications. A USB interface may support a variety of devices in a variety of environments. One such contemplated environment includes devices configured for mobile applications and devices configured for standard power configurations. In mobile applications, for instance, a 5 mA, 4 mA and even lower power output may be desired, but in standard applications, 100 mA power output for powering legacy (such as traditional) devices may be desired.

For example, logic determines utilization of a device including a converter 1602 of the present invention. If the device is being utilized in a mobile application, such as being operated on battery power, an initial configuration may be set for mobile use 1604, such as for 4 mA power output. If the device is being utilized in an externally powered application, the initial configuration may be set as a conventional configuration 1606, such as 100 mA power output. The output is fed based on the determined configuration 1608. The logic may then monitor comparator outputs and adjusts control accordingly 1610, such as if the device switches from battery operation to externally powered operation, switches power modes, and the like. For example, a device may be added and/or disconnected 1612 to an interface. If a device is added, logic may determine required current for the remaining devices 1614 and adjust power characteristics based on the determination 1616.

Figure 17:
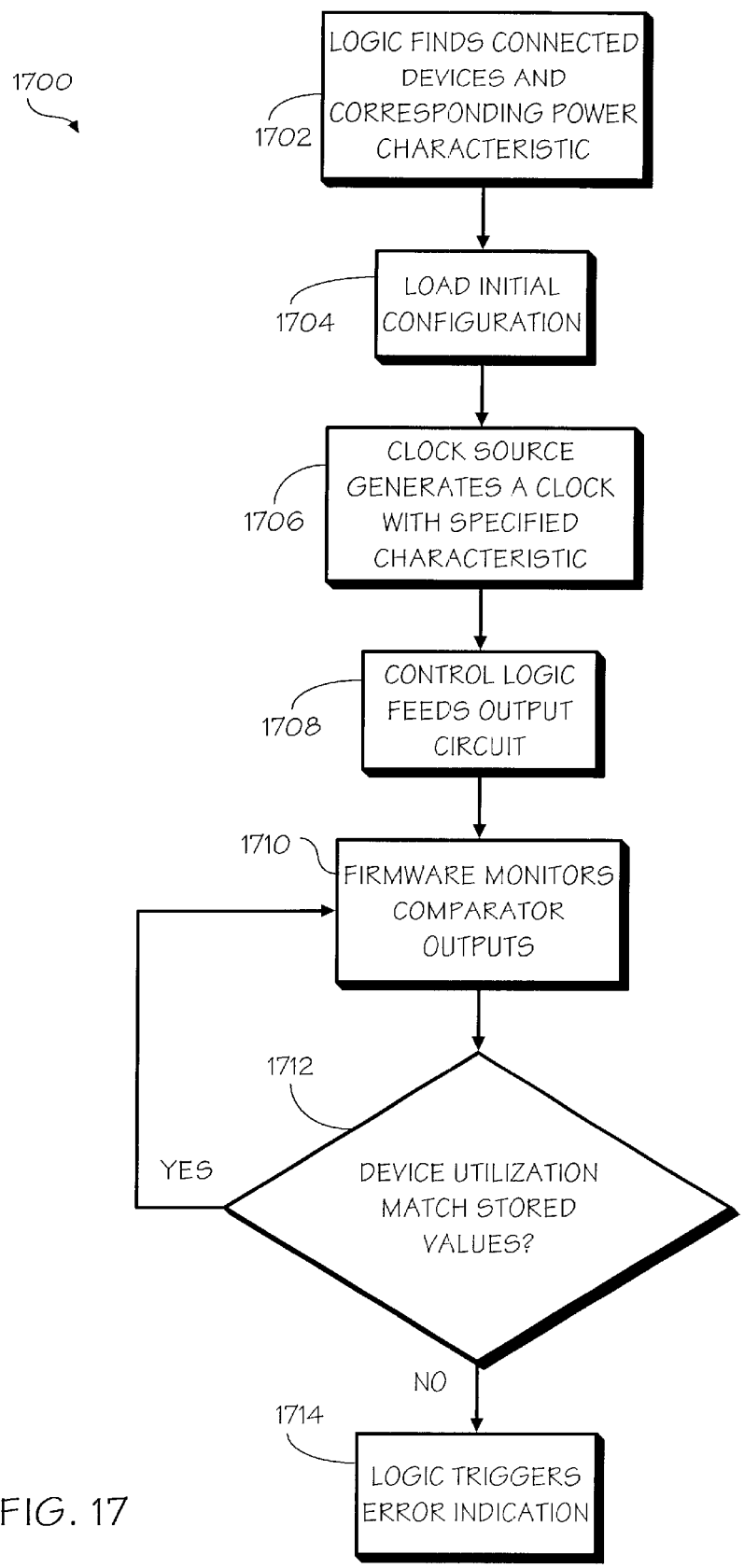
FIG. 17 is a flow diagram illustrating an exemplary method of the present invention wherein power utilization of a device connected to a converter of the present invention is used to detect error conditions.

Referring now to FIG. 17, an exemplary method 1700 of the present invention is shown wherein power utilization of a device connected to a converter of the present invention is used to detect error conditions. Logic finds connected devices and corresponding power characteristics 1702. An initial configuration is loaded 1704 and utilized to supply corresponding power characteristics. For example, a clock source may generate a clock signal with specified characteristics 1706, such as to generate a corresponding duty cycle and the like. Thus, control logic may feed the output circuit 1708.

For example, firmware, as employed in a processor of a converter of the present invention, monitors comparator outputs 1710. The comparator outputs are then compared with stored values for device utilization 1712. If device utilization matches a profile of the stored values, such as a profile indicating normal operating range, the device may be functioning properly and the firmware may continue to monitor the outputs 1710. However, if device utilization does not match the stored values 1712, logic may trigger an error indication 1714 to indicate the device is not functioning properly, such as by implementing an interrupt and the like as contemplated by a person of ordinary skill in the art. In this way, utilization of power by a device may be used to determine if a device is functioning properly. Additionally, power utilization by a device connected to a converter of the present invention may be utilized to determine possible damaging conditions which may occur to a host and/or converter of the present invention.

Figure 18:
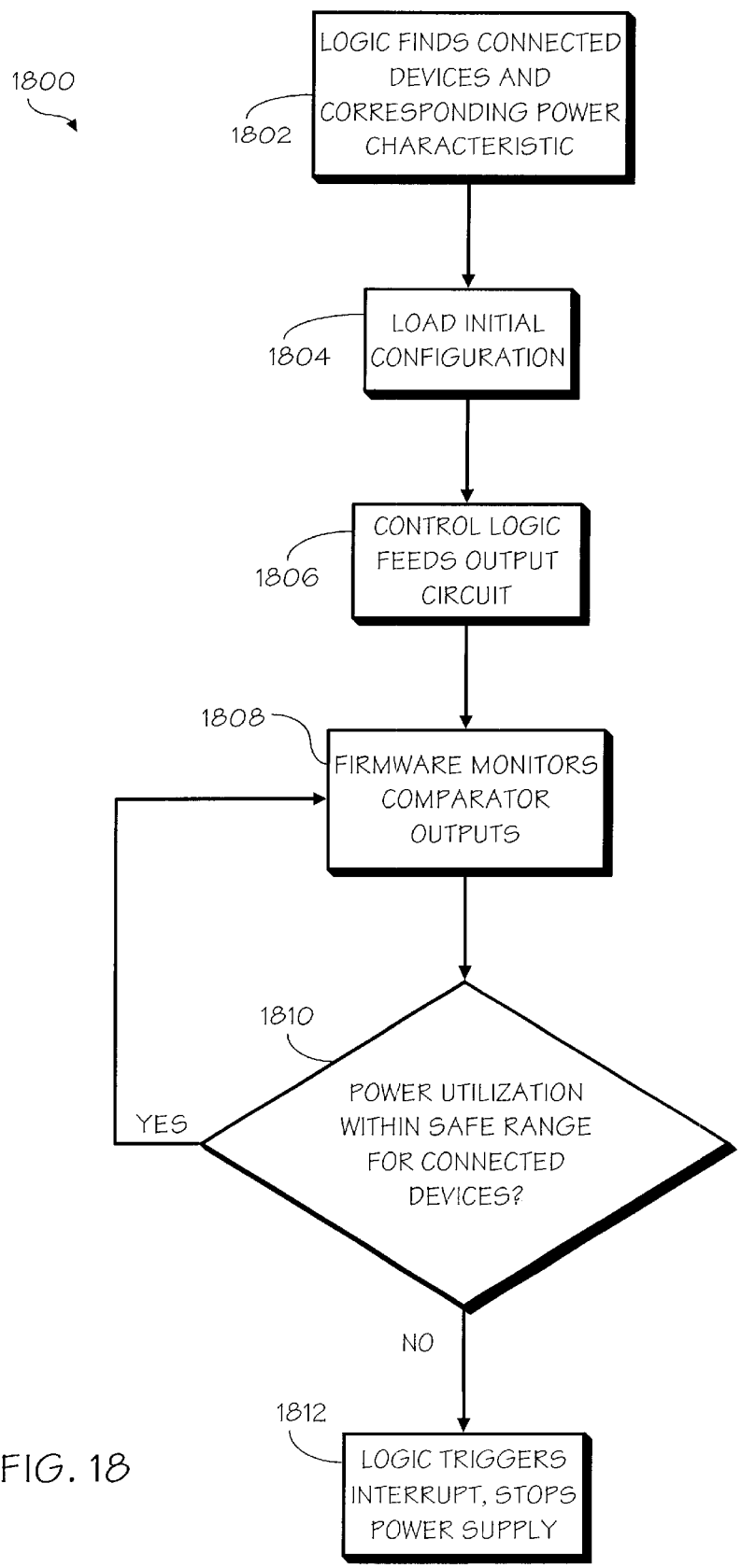
FIG. 18 is a flow diagram depicting an exemplary method of the present invention wherein power utilization by a device connected to a converter of the present invention may be utilized to determine whether a condition which may damage a host and/or converter will occur.

For example, as shown in the exemplary method 1800 depicted in FIG. 18, power utilization by a device connected to a converter of the present invention may be utilized to determine whether a condition which may damage a host and/or converter will occur. Logic finds connected devices and corresponding power characteristics 1802. An initial configuration is loaded 1804, and control logic is used to feed an output circuit 1806. For example, firmware monitors comparator outputs 1808. A determination is then made as to whether power utilization is within a safe range for connected devices 1810. For instance, power utilization of a device may indicate a possible harmful condition that may affect the rest of a host system. Additionally, power utilization of a device may occur at levels that are harmful to a converter and/or host system. Thus, logic identifying the possible harmful condition may trigger an interrupt to notify a host system and stop a power supply 1812.

Figure 19:
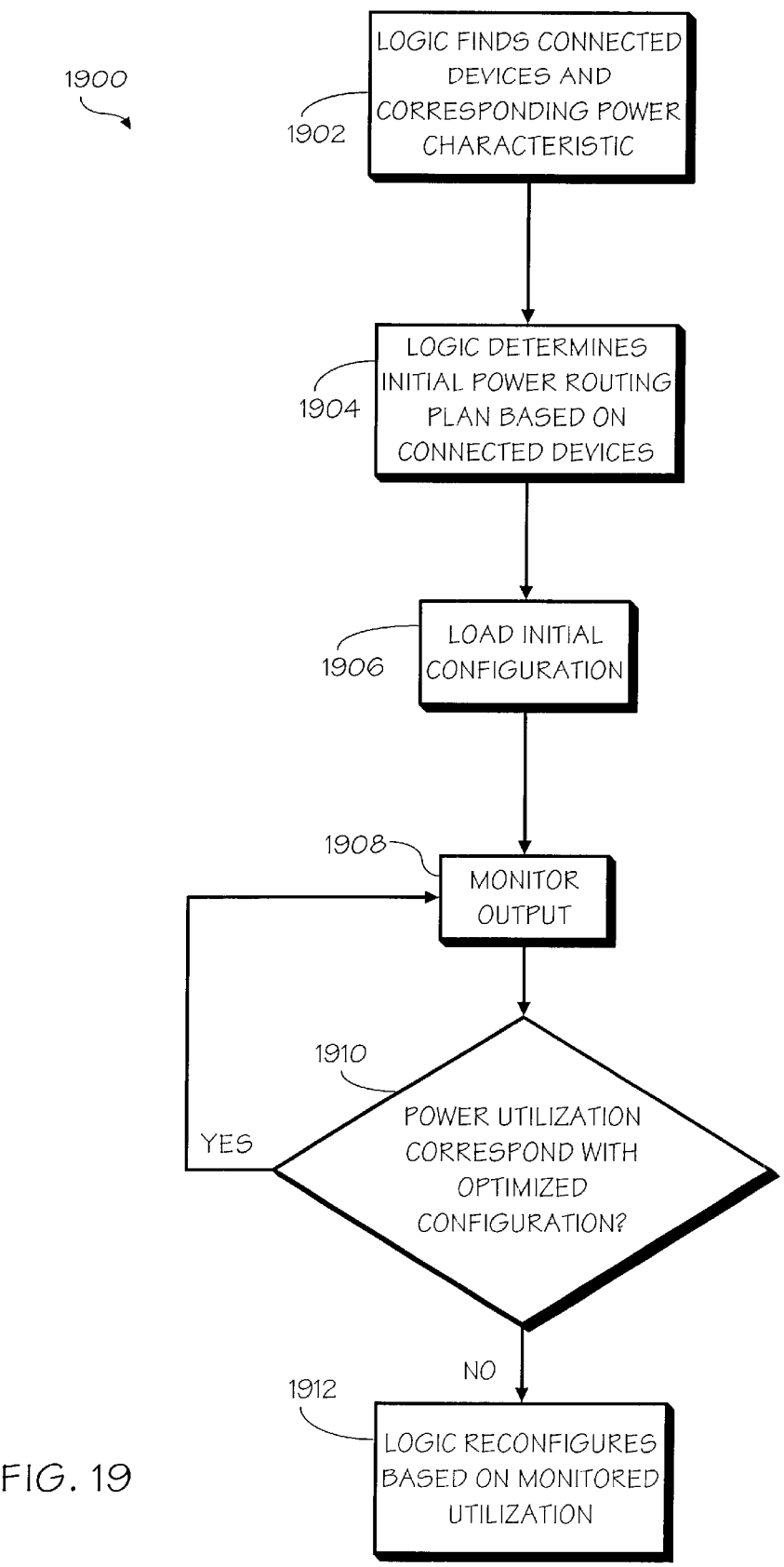
FIG. 19 is a flow diagram illustrating an exemplary method of the present invention wherein a converter, providing power to a plurality of devices, routes power based on device needs.

Referring now to FIG. 19, an exemplary method 1900 of the present invention is shown wherein a converter, providing power to a plurality of devices, routes power based on device needs. Converter logic finds connected devices and corresponding power characteristics 1902. Logic determines an initial power routing plan based on the connected devices 1904, and loads an initial configuration 1906. For example, a converter of the present invention may make best use of available power based on device characteristics. For instance, devices may be placed in a hierarchy based on criticality of either use, sensitivity to fluctuation, power characteristics, and the like. Thus, the invention may monitor use and predict a term of use or the like and provide power to best achieve perceived or selected use, thus rationing available power accordingly.

For example, output may be monitored 1908 and a determination made if power utilization corresponds with an optimized configuration 1910. If it does, the logic may continue monitoring 1908. However, if power utilization does not correspond with optimized configuration, the logic may reconfigure based on the monitored utilization 1912.

For instance, traditional devices may be included with power saving devices, and by utilizing the present invention, have the power saving devices operate in a power saving mode, with higher drain devices being powered at operational levels. Additionally, power input may be regulated, such as a different type of battery (discharge cycle), use of partially depleted battery, switch from battery to external source, such as an outlet source or other power output which is input into the present invention. Further, power may be routed based on task, as shown in the next embodiment.

Figure 20:
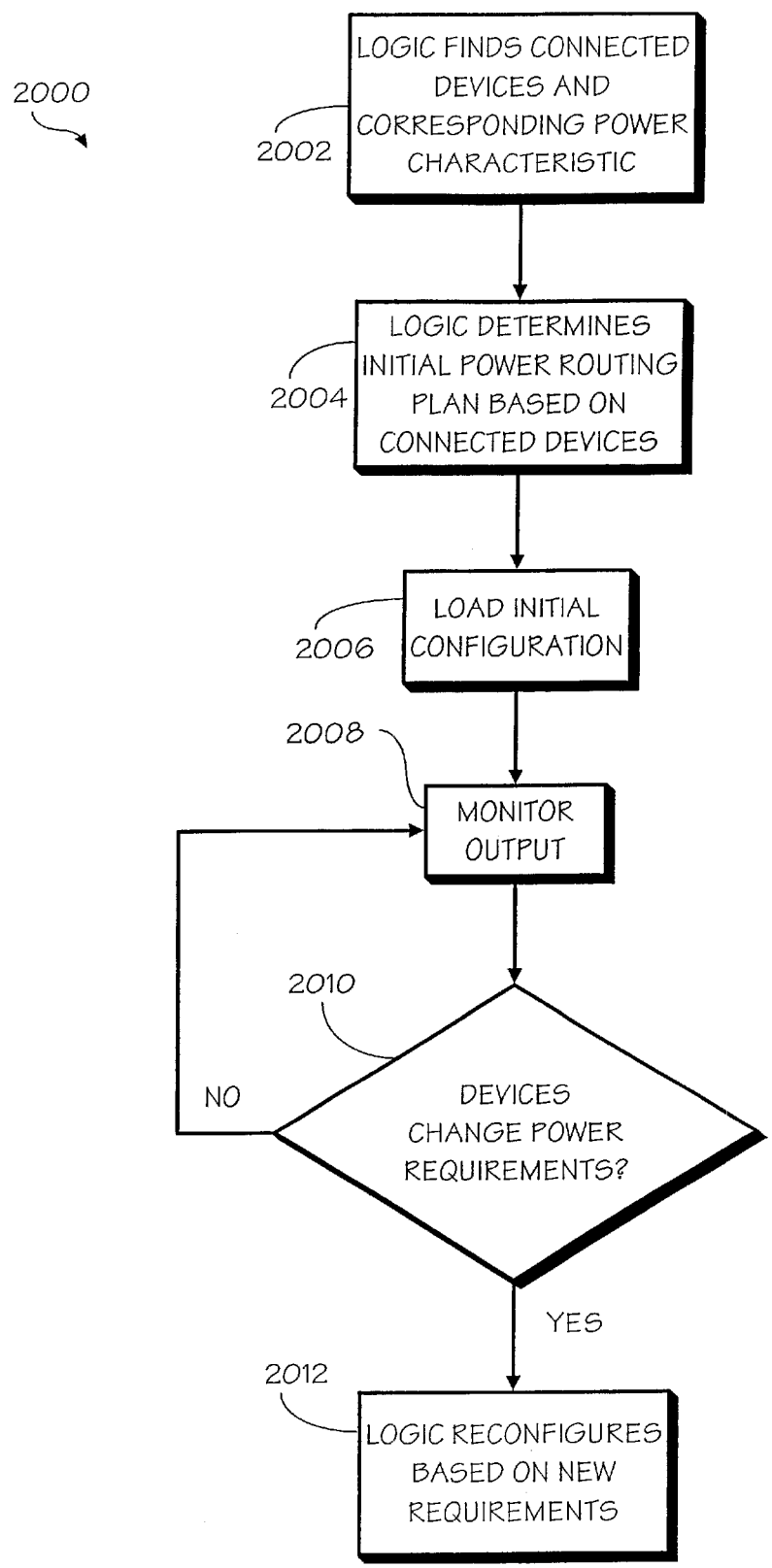
FIG. 20 is a flow diagram depicting an exemplary embodiment of the present invention wherein routing is performed and reconfigured based on changing device needs to optimize device operation.

Referring now to FIG. 20, an exemplary method 2000 of the present invention is shown wherein routing is performed and reconfigured based on changing device needs to optimize device operation. Devices utilizing the present invention may have more than one power state, such as a first power state suitable for operation with an outlet power source and a second power conservation state suitable for mobile operation. By routing power in conjunction with the use of multiple device states, the present invention may maximize system functionality.

For example, logic may find connected devices and corresponding power characteristics 2002. Logic then determines an initial power routing plan 2004 based on connected device, which may be based on the power characteristics and contemplated mode of operation of the connected devices. The initial configuration is loaded 2006 and output monitored 2008. If devices change power requirements 2010, the logic may reconfigure based on the new requirements 2012, so that more power is supplied to a first device requiring additional power while reducing available power to a second device. For example, a first device, such as a processor capable of operation in multiple power levels, may be changed to a lower power state to enable a second device, such as a hard drive, to rotate at a higher speed utilizing the increased available power.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more host systems. Until required by a host system, the set of instructions may be stored in another readable memory device, for example in a hard disk drive or in a removable memory such as an optical disc for utilization in a CD-ROM drive, a floppy disk for utilization in a floppy disk drive, a floppy/optical disc for utilization in a floppy/optical drive, or a personal computer memory card for utilization in a personal computer card slot. Further, the set of instructions may be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the flexible converter of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A routing apparatus, comprising:
  (a) a converter capable of providing an output supply from an input supply coupled to said converter, said output supply capable of routing between a first output and a second output;
  (b) at least one comparator coupled to said output supply of said converter, said comparator being capable of measuring at least one power characteristic of said first output and said second output to a first electrical device and to a second electrical device; and
  (c) a controller coupled to said comparator; said controller being capable of implementing a process within said converter such that said first output is routed to said first electrical device and said second output is routed to said second electrical device, and said first output and said second output are monitored with the at least one comparator and said first output to said first electrical device and said second output to said second electrical device are re-routed based upon said monitoring by said comparator.

2. The apparatus as described in claim 1, wherein said power characteristics include at least one of a voltage level, a current level, a frequency level, and a signal clarity level.

3. The apparatus as described in claim 1, wherein said converter is capable of adjusting at least one of said first output and said second output by varying an amount of current received by a load receiving said output supply.

4. The apparatus as described in claim 3, wherein said amount of current, received by at least one of said first electrical device and said second electrical device, is manipulated by altering at least one of a duty cycle and a frequency of a clock generated by a clock source.

5. The apparatus as described in claim 1, wherein the first electrical device and the second electrical device are placed in a hierarchy so that said first output to said first electrical device and said second output to said second electrical device are routed based upon the hierarchy.

6. The apparatus as described in claim 5, wherein the first electrical device and the second electrical device are placed in the hierarchy based on at least one of criticality of use, sensitivity to fluctuation and power characteristic.

7. The apparatus as described in claim 1, wherein said first output is routed to said first electrical device and said second output is routed to said second electrical device based upon a determined initial configuration including a power characteristic of said first electrical device and said second electrical device.

8. A system for routing an input power supply into a first desired output supply and a second desired output supply, comprising:
  (a) a converter capable of providing an output supply from an input supply coupled to said converter, said output supply capable of routing between a first output and a second output;
  (b) a first electrical device electrically connected to said first output, said first electrical device having a first power characteristic;
  (c) a second electrical device electrically connected to said second output, said second electrical device having a second power characteristic;
  (d) at least one comparator coupled to said output supply of said converter, said comparator being capable of measuring said first power characteristic and said second power characteristic in relation to target power characteristics of said first electrical device and of said second electrical device; and (e) a controller coupled to said comparator; said controller being capable of implementing a process within said converter such that said first output is routed to said first electrical device and said second output is routed to said second electrical device based on a determined initial configuration including said first power characteristic and said second power characteristic, wherein when said controller receives an indication of a change in said first power characteristic to said first electrical device, said first output to said first electrical device and said second output to said second electrical device are re-routed to provide said changed first power characteristic to said first electrical device.

9. The system as described in claim 8, wherein said power characteristics include at least one of a voltage level, a current level, a frequency level, and a signal clarity level.

10. The system as described in claim 8, wherein said controller receives the indication by at least one of monitoring said first electrical device and data received from said first electrical device, said first electrical device communicatively connected to said controller.

11. The system as described in claim 10, wherein data includes protocol data.

12. The system as described in claim 8, wherein said converter is capable of adjusting at least one of said first output and said second output by varying an amount of current received by a load, wherein said amount of current, received by at least one of said first electrical device and said second electrical device, is manipulated by altering at least one of a duty cycle and a frequency of a clock generated by a clock source.

13. A method, comprising:

generating a first output having a first power characteristic and a second output having a second power characteristic, said first power output provided to a first electric device and said second output provided to a second electrical device;

monitoring said first output and said second output with a comparator, the comparator suitable for measuring said first power characteristic and said second power characteristic; and routing said first output to said first electrical device and said second output to said second electrical device based on measured first power characteristic and measured second power characteristic.

14. The method as described in claim 13, wherein the power characteristic includes at least one of voltage, current, noise, signal clarity and duty cycle.

15. The method as described in claim 13, further comprising determining an initial power configuration for the comparator by a controller, the initial power configuration including power characteristics of said first electric device and said second electrical device.

16. The method as described in claim 15, wherein at least one of said first output and said second output is routed based on the determined configuration, and wherein said monitored first output power characteristics changes, routing said first power to said first electrical device and said second output to said second electrical device based on the monitored characteristic change.

17. The method as described in claim 13, wherein said first electrical device and said second electrical device are suitable for attaining a first power-saving level and a second power intensive level, routing is performed based on said first output to the first electrical device at a power characteristic having the first power saving level and said second output to said second electrical device at a power characteristic having said second power intensive level.

18. The method as described in claim 17, wherein said routing is performed in response to a power intensive condition entered into by said second electrical device.

19. The method as described in claim 13, wherein said first monitored output and said second monitored output are utilized in conjunction with routing so that power is routed by said converter between said first electrical device and said second electrical device.

20. The method as described in claim 13, wherein said first electrical device and said second electrical device are placed in a hierarchy, said first output to said first electrical device and said second output to said second electrical device are routed based upon said hierarchy.

* * * * *

UNITED STATES PATENT AND TRADEMARK OFFICE
CERTIFICATE OF CORRECTION

PATENT NO.    : 6,580,623 B1
DATED         : June 17, 2003
INVENTOR(S)   : Williams et al.

It is certified that error appears in the above-identified patent and that said Letters Patent is hereby corrected as shown below:

Column 10,
Line 26, "if the drive settings 25 are" should read -- if the drive settings are --.

Signed and Sealed this

Ninth Day of March, 2004

JON W. DUDAS
*Acting Director of the United States Patent and Trademark Office*